(12) United States Patent
Awoniyi-Oteri et al.

(10) Patent No.: US 12,513,533 B2
(45) Date of Patent: Dec. 30, 2025

(54) UPDATING BEAM OR MEASUREMENT CONFIGURATIONS USING ANTENNA ORIENTATION INFORMATION ASSOCIATED WITH USER EQUIPMENTS

(71) Applicant: QUALCOMM Incorporated, San Diego, CA (US)

(72) Inventors: Olufunmilola Omolade Awoniyi-Oteri, San Diego, CA (US); Tao Luo, San Diego, CA (US); Yan Zhou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 384 days.

(21) Appl. No.: 17/649,914

(22) Filed: Feb. 3, 2022

(65) Prior Publication Data

US 2022/0256359 A1     Aug. 11, 2022

Related U.S. Application Data

(60) Provisional application No. 63/146,535, filed on Feb. 5, 2021.

(51) Int. Cl.
*H04W 16/28*     (2009.01)
*H04W 24/10*     (2009.01)

(52) U.S. Cl.
CPC .......... *H04W 16/28* (2013.01); *H04W 24/10* (2013.01)

(58) Field of Classification Search
CPC ....... H04W 16/28; H04W 24/10; H04W 8/24; H04W 24/02; H04B 7/0404; H04B 7/0608; H04B 7/0691; H04B 7/0695
See application file for complete search history.

(56) References Cited

U.S. PATENT DOCUMENTS

| | | | |
|---|---|---|---|
| 2016/0277911 A1* | 9/2016 | Kang | H04W 16/28 |
| 2017/0269713 A1* | 9/2017 | Marks | A63F 13/86 |
| 2018/0227024 A1* | 8/2018 | Xia | H04B 7/0695 |
| 2020/0275402 A1* | 8/2020 | Shi | H04W 76/11 |
| 2020/0374960 A1* | 11/2020 | Deenoo | H04B 7/0695 |
| 2022/0271810 A1* | 8/2022 | Loghin | H04B 7/0695 |
| 2022/0341751 A1* | 10/2022 | Abdelrahman | G01S 17/89 |
| 2022/0358730 A1* | 11/2022 | Otsuki | G06T 19/006 |
| 2023/0246698 A1* | 8/2023 | Bastani | H04B 7/0695 370/310 |

(Continued)

OTHER PUBLICATIONS

3GPP TSG RAN WG1 Meeting #104-e; R1-2100208; Source: Huawei, HiSilicon; Title: Enhancements on multi-beam operation; E-meeting, Jan. 25-Feb. 5, 2021. (Year: 2021).*

(Continued)

*Primary Examiner* — Mohammed S Chowdhury
(74) *Attorney, Agent, or Firm* — Harrity & Harrity LLP/Qualcomm Incorporated

(57) ABSTRACT

Various aspects of the present disclosure generally relate to wireless communication. In some aspects, a user equipment (UE) may transmit, to a network entity, one of UE pose information or UE antenna orientation information, wherein the UE antenna orientation information is extracted from the UE pose information. The UE may receive, from the network entity, an updated beam or measurement configuration based at least in part on the UE antenna orientation information. Numerous other aspects are described.

30 Claims, 12 Drawing Sheets

(56) References Cited

U.S. PATENT DOCUMENTS

| | | | | |
|---|---|---|---|---|
| 2023/0260191 A1* | 8/2023 | Mihály | ................... | G06F 3/011 |
| | | | | 345/419 |
| 2023/0327736 A1* | 10/2023 | Gao | ...................... | H04L 5/0053 |
| | | | | 370/329 |

OTHER PUBLICATIONS

3GPP TSG RAN WG1 Meeting #104-e; R1-2100288 ; Source: ZTE; Title: Enhancements on beam management for multi-TRP; e-Meeting, Jan. 25-Feb. 5, 2021 (Year: 2021).*

IEEE -: Beam Management in Millimeter-Wave Communications for 5G and Beyond; Yu-Ngok Ruyue Li 1, Bo Gao1, Xiaodan Zhang2, and Kaibin Huang 3, (Senior Member, IEEE). accepted Dec. 19, 2019, date of publication Jan. 1, 2020. (Year: 2021).*

* cited by examiner

UPDATING BEAM OR MEASUREMENT CONFIGURATIONS USING ANTENNA ORIENTATION INFORMATION ASSOCIATED WITH USER EQUIPMENTS

CROSS-REFERENCE TO RELATED APPLICATION

This Patent Application claims priority to U.S. Provisional Patent Application No. 63/146,535, filed on Feb. 5, 2021, entitled "UPDATING BEAM OR MEASUREMENT CONFIGURATIONS USING ANTENNA ORIENTATION INFORMATION ASSOCIATED WITH USER EQUIPMENTS," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for updating beam or measurement configurations using antenna orientation information associated with user equipments (UEs).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes transmitting, to a network entity, one of UE pose information or UE antenna orientation information, wherein the UE antenna orientation information is extracted from the UE pose information; and receiving, from the network entity, an updated beam or measurement configuration based at least in part on the UE antenna orientation information.

In some aspects, a method of wireless communication performed by a network entity includes receiving, from one or more of a UE or a server, one of UE pose information or UE antenna orientation information, wherein the UE antenna orientation information is extracted from the UE pose information; determining an updated beam or measurement configuration based at least in part on the UE antenna orientation information; and transmitting, to the UE, the updated beam or measurement configuration.

In some aspects, a UE for wireless communication includes a memory and one or more processors, coupled to the memory, configured to: transmit, to a network entity, one of UE pose information or UE antenna orientation information, wherein the UE antenna orientation information is extracted from the UE pose information; and receive, from the network entity, an updated beam or measurement configuration based at least in part on the UE antenna orientation information.

In some aspects, a network entity for wireless communication includes a memory and one or more processors, coupled to the memory, configured to: receive, from one or more of a UE or a server, one of UE pose information or UE antenna orientation information, wherein the UE antenna orientation information is extracted from the UE pose information; determine an updated beam or measurement configuration based at least in part on the UE antenna orientation information; and transmit, to the UE, the updated beam or measurement configuration.

In some aspects, a non-transitory computer-readable medium storing a set of instructions for wireless communication includes one or more instructions that, when executed by one or more processors of a UE, cause the UE to: transmit, to a network entity, one of UE pose information or UE antenna orientation information, wherein the UE antenna orientation information is extracted from the UE pose information; and receive, from the network entity, an updated beam or measurement configuration based at least in part on the UE antenna orientation information.

In some aspects, a non-transitory computer-readable medium storing a set of instructions for wireless communication includes one or more instructions that, when executed by one or more processors of a network entity, cause the network entity to: receive, from one or more of a UE or a server, one of UE pose information or UE antenna orientation information, wherein the UE antenna orientation information is extracted from the UE pose information; determine an updated beam or measurement configuration based at least in part on the UE antenna orientation information; and transmit, to the UE, the updated beam or measurement configuration.

In some aspects, an apparatus for wireless communication includes means for transmitting, to a network entity, one of apparatus pose information or apparatus antenna orientation information, wherein the apparatus antenna orientation information is extracted from the apparatus pose information; and means for receiving, from the network entity, an updated beam or measurement configuration based at least in part on the apparatus antenna orientation information.

In some aspects, an apparatus for wireless communication includes means for receiving, from one or more of a UE or a server, one of UE pose information or UE antenna orientation information, wherein the UE antenna orientation information is extracted from the UE pose information; means for determining an updated beam or measurement configuration based at least in part on the UE antenna orientation information; and means for transmitting, to the UE, the updated beam or measurement configuration.

Aspects generally include a method, apparatus, system, computer program product, non-transitory computer-readable medium, user equipment, network entity, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
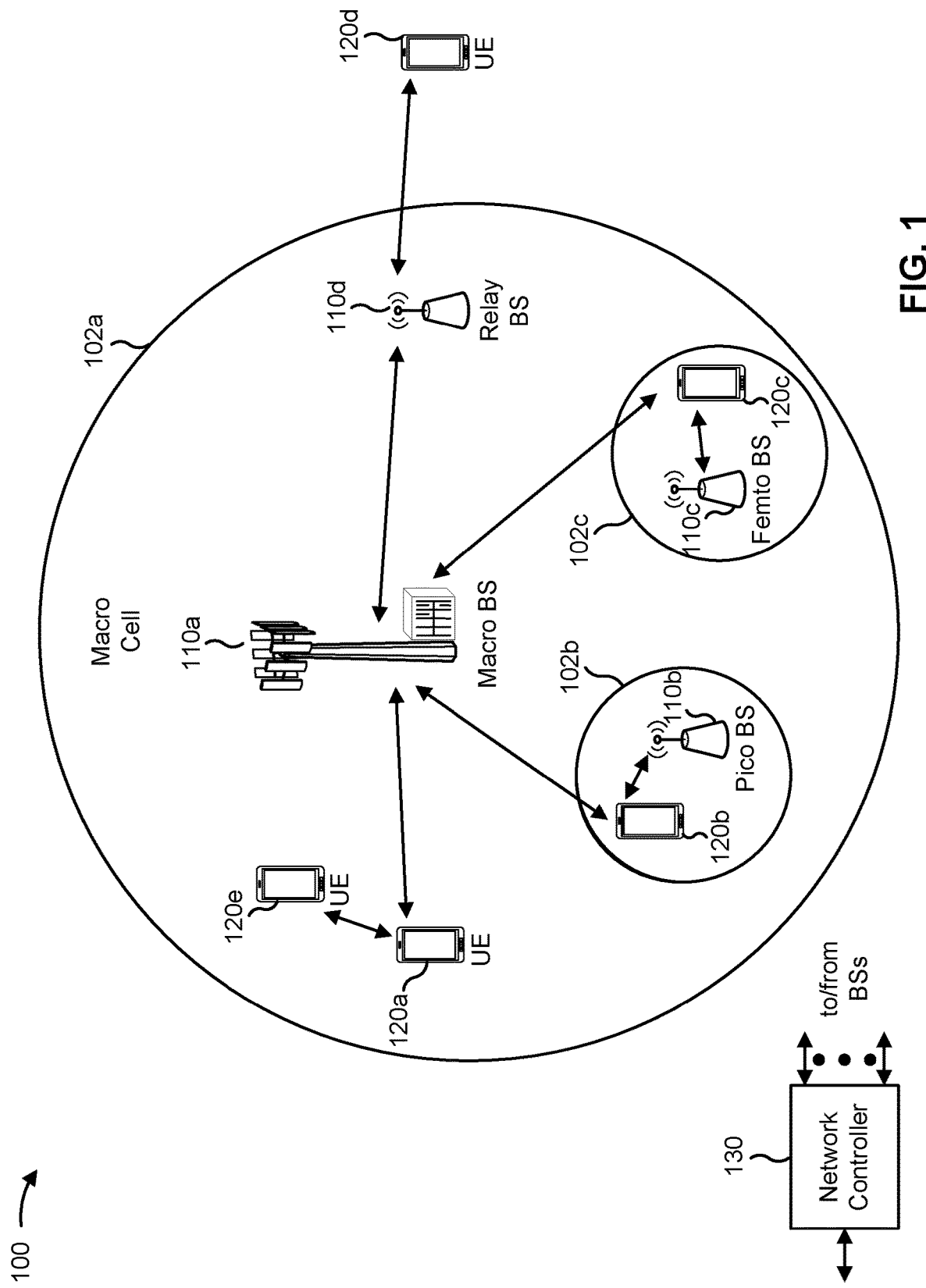
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some aspects, the term "base station" (e.g., the base station 110) or "network entity" may refer to an aggregated base station, a disaggregated base station, an integrated access and backhaul (IAB) node, a relay node, and/or one or more components thereof. For example, in some aspects, "base station" or "network entity" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some aspects, the term "base station" or "network entity" may refer to one device configured to perform one or more functions, such as those described herein in connection with the base station 110. In some aspects, the term "base station" or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station" or "network entity" may refer to any one or more of those different devices. In some aspects, the term "base station" or "network entity" may refer to one or more virtual base stations and/or one or more virtual base station functions. For example, in some aspects, two or more base station functions may be instantiated on a single device. In some aspects, the term "base station" or "network entity" may refer to one of the base station functions and not another. In this way, a single device may include more than one base station.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

As indicated above, FIG. 1 is provided as an example. Other examples may differ from what is described with regard to FIG. 1.

Figure 2:
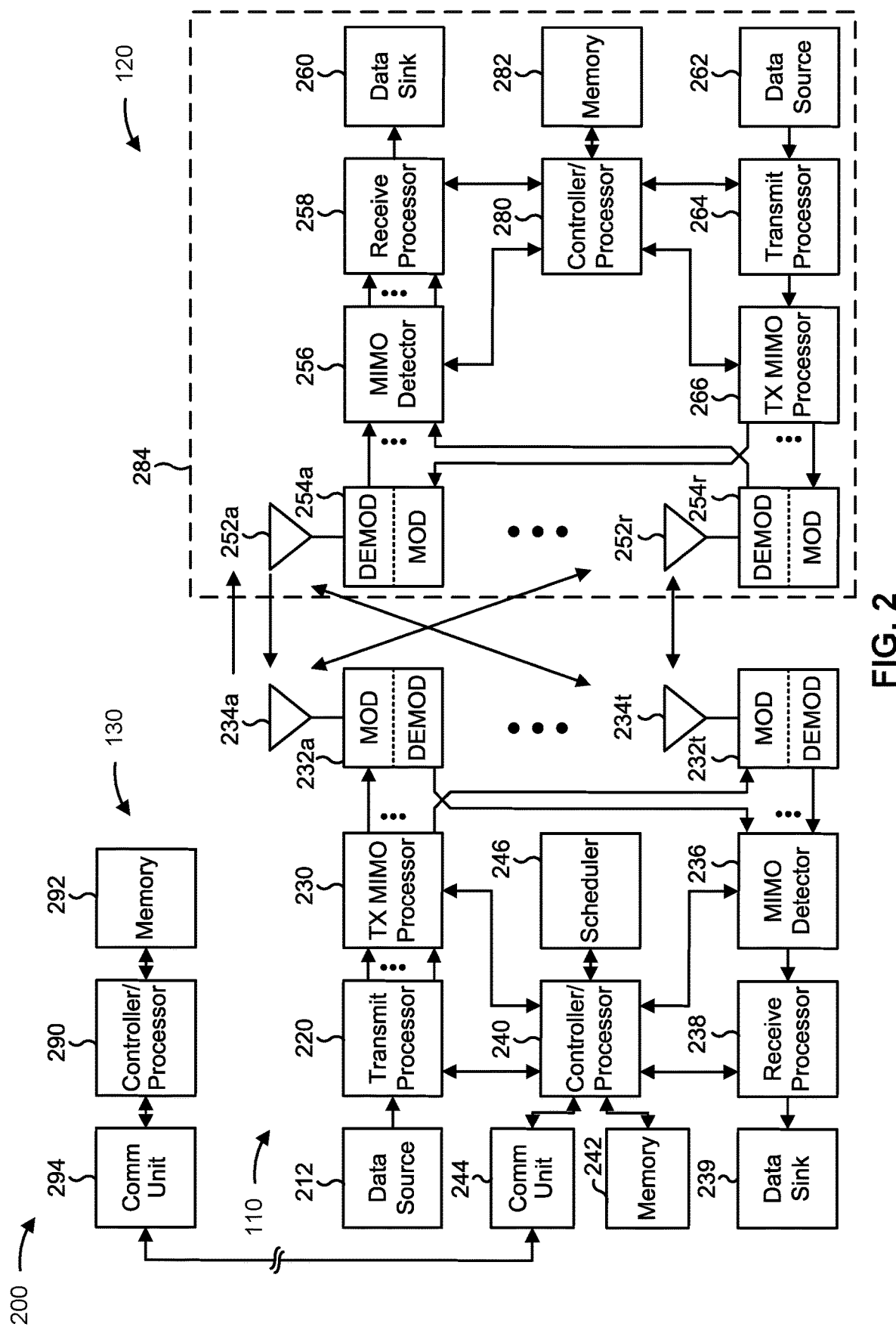
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234*a* through 234*t*, such as T antennas (T≥1). The UE 120 may be equipped with a set of antennas 252*a* through 252*r*, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 3-9).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 3-9).

The controller/processor 240 of the base station 110, the controller/processor 280 of the UE 120, and/or any other component(s) of FIG. 2 may perform one or more techniques associated with updating beam or measurement configurations using antenna orientation information associated with UEs, as described in more detail elsewhere herein. For example, the controller/processor 240 of the base station 110, the controller/processor 280 of the UE 120, and/or any other component(s) of FIG. 2 may perform or direct operations of, for example, process 800 of FIG. 8, process 900 of FIG. 9, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, a UE (e.g., UE 120) includes means for transmitting, to a network entity, one of UE pose information or UE antenna orientation information, wherein the UE antenna orientation information is extracted from the UE pose information (e.g., using controller/processor 280, transmit processor 264, TX MIMO processor 266, MOD 254, antenna 252, and/or memory 282); and/or means for receiving, from the network entity, an updated beam or measurement configuration based at least in part on the UE antenna orientation information (e.g., using antenna 252, DEMOD 254, MIMO detector 256, receive processor 258, controller/processor 280, and/or memory 282).

In some aspects, a network entity (e.g., base station 110) includes means for receiving, from one or more of a UE or a server, one of UE pose information or UE antenna orientation information, wherein the UE antenna orientation information is extracted from the UE pose information (e.g., using antenna 234, DEMOD 232, MIMO detector 236, receive processor 238, controller/processor 240, and/or memory 242); means for determining an updated beam or measurement configuration based at least in part on the UE antenna orientation information (e.g., using controller/processor 240, and/or memory 242); and/or means for transmitting, to the UE, the updated beam or measurement configuration (e.g., using controller/processor 240, transmit processor 220, TX MIMO processor 230, MOD 232, antenna 234, and/or memory 242).

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Extended reality (XR) traffic is increasingly being transmitted using cellular networks, and is expected to be transmitted using 5G NR FR2 (e.g., millimeter wave) networks. XR traffic may include augmented reality (AR) traffic, mixed reality (MR) traffic, and/or virtual reality (VR) traffic.

A UE, such as a head-mounted display (HMD), may receive XR traffic from a server, such as an application server. The UE may receive the XR traffic from the server via a network entity, such as a base station. For example, the UE may periodically transmit pose information to the server via the network entity. The pose information may indicate a movement or a rotation of the UE based at least in part on a head movement or a head rotation of a user associated with the UE. The server may generate XR traffic associated with a rendered scene based at least in part on the pose information. The server may transmit the XR traffic to the UE via the network entity. In this case, an XR application executing on the UE may be a split-rendering XR application, such that scenes may be rendered at the server and transmitted to the UE (as opposed to scenes being rendered at the UE itself), which may reduce power consumption at the UE.

The UE may transmit measurement reports to the network entity, and the network entity may trigger beam and/or measurement updates for the UE based at least in part on the measurement reports. However, in some cases, slight movements or rotations of the UE may not result in changes in measurement reports that satisfy a threshold, and beam and/or measurement updates may not be triggered for the UE, even when an updated beam may be favorable for the UE based at least in part on a change in UE orientation.

In various aspects of techniques and apparatuses described herein, the UE may determine UE pose information indicating a movement or a rotation of the UE. The UE may determine UE antenna orientation information based at least in part on the UE pose information. For example, the UE may extract the UE antenna orientation information from the UE pose information based at least in part on a mapping between the UE pose information and the UE antenna orientation information. The UE antenna orientation information may be orientation information that is correlated with an antenna configuration of the UE. In other words, the UE antenna orientation information may indicate a specific rotation, movement, position, etc. with respect to one or more antennas of the UE. The UE may transmit the UE antenna orientation information to the network entity, and the network entity may trigger beam and/or measurement updates for the UE based at least in part on the UE antenna orientation information. The network entity may use the UE antenna orientation information to predict that beam and/or measurement updates are needed by the UE. As a result, the beam and/or measurement updates for the UE may be based at least in part on the UE antenna orientation information received from the UE, which may improve the triggering of beam and/or measurement updates for the UE by the network entity.

In some aspects, the UE may transmit the UE pose information to the network entity. The network entity may determine the UE antenna orientation configuration based at least in part on the UE pose information. In other words, the network entity may extract the UE antenna orientation configuration from the UE pose information, based at least in part on a known antenna configuration of the UE. The network entity may trigger beam and/or measurement updates for the UE based at least in part on the UE antenna orientation information.

In some aspects, when a user associated with the UE moves or rotates the user's head, thereby moving or rotating the UE, antennas of the UE may be moved or rotated as well and may no longer be suitable to use certain beams to communicate data with the network entity. In this case, the UE antenna orientation information, which may reflect the movements or rotations of the UE in relation to one or more antennas of the UE, may trigger the beam and/or measurement updates for the UE.

Figure 3:
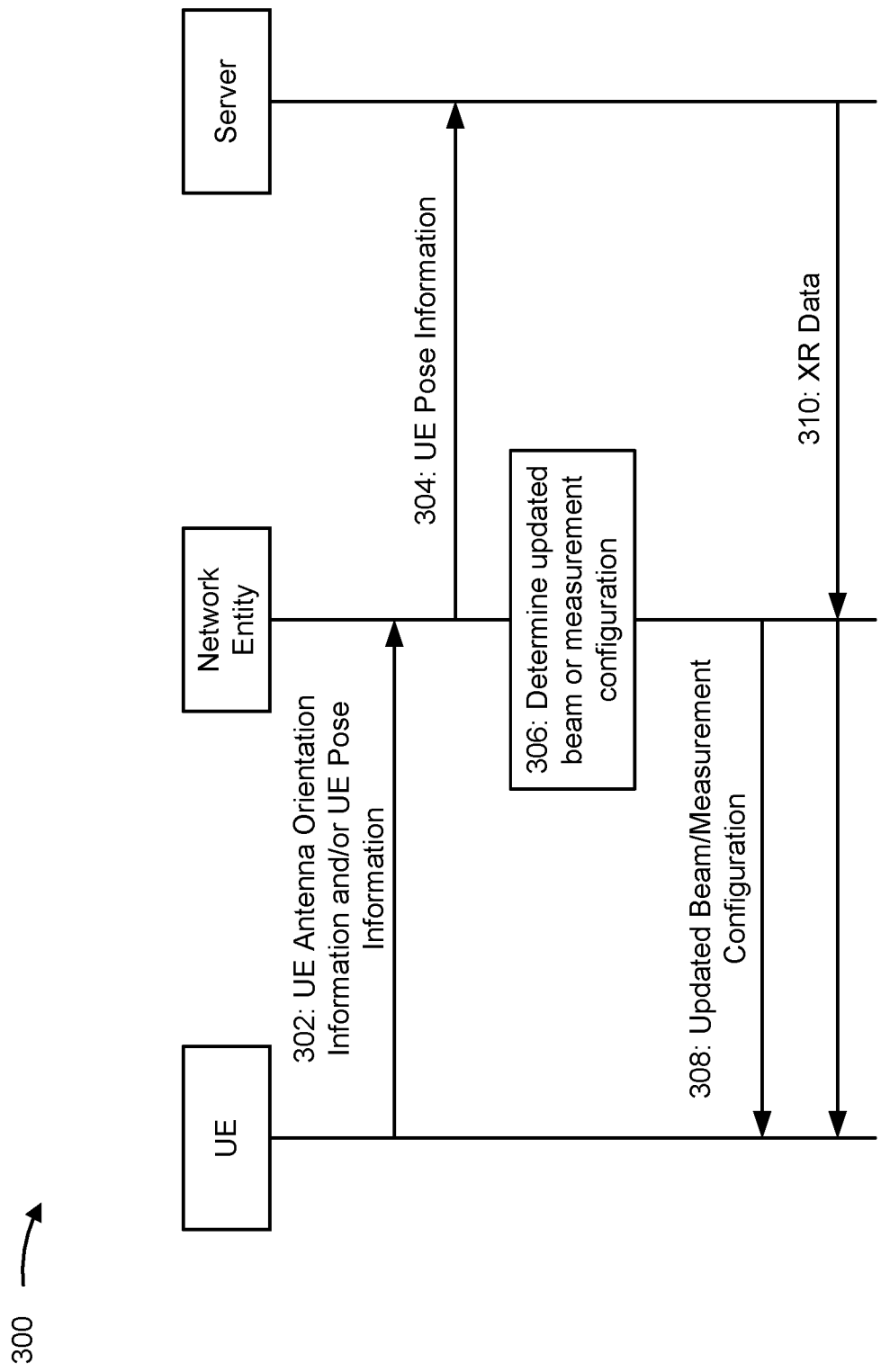
FIGS. 3-7 are diagrams illustrating examples associated with updating beam or measurement configurations using antenna orientation information associated with UEs, in accordance with the present disclosure.

FIG. 3 is a diagram illustrating an example 300 associated with updating beam or measurement configurations using orientation information associated with UEs, in accordance with the present disclosure. As shown in FIG. 3, example 300 includes communication between a UE (e.g., UE 120), a network entity (e.g., base station 110), and a server. In some aspects, the UE, the network entity, and the server may be included in a wireless network such as wireless network 100.

As shown by reference number 302, a UE (e.g., an HMD) may transmit, to the network entity, UE pose information and/or UE antenna orientation information. The UE antenna orientation information may be associated with an antenna configuration of the UE. The antenna configuration may indicate a number of antennas in the UE, a relative position of antennas in relation to other antennas within the UE, a layout of the antennas, etc. In some aspects, the UE antenna orientation information may indicate rotation information associated with the UE, and/or positioning information associated with the UE. In some aspects, the UE antenna orientation information may indicate a change in rotation associated with the UE, and/or a change in position associated with the UE. In some aspects, the UE antenna orientation information may be associated with an antenna configuration of the UE, such that the UE pose information may be correlated with the antenna configuration of the UE to produce the UE antenna orientation information. In other words, the UE antenna orientation information may be extracted from the UE pose information based at least in part on a mapping between the UE pose information and the UE antenna orientation information.

As an example, the UE antenna orientation information may indicate that a user's head associated with the UE rotated 20 degrees in certain direction, moved from a first position to a second position, etc. Depending on a change in orientation of the UE, one antenna in the UE may be better directed towards the network entity as compared to another antenna in the UE. Thus, the UE antenna orientation information may incorporate the antenna configuration of the UE.

As shown by reference number 304, the network entity may transmit the UE pose information and/or UE antenna orientation information to the server. In other words, the network entity may forward the UE pose information and/or the UE antenna orientation information received from the UE to the server.

As shown by reference number 306, the network entity may determine an updated beam or measurement configuration for the UE based at least in part on the UE pose information and/or the UE antenna orientation information. In other words, the network entity may determine to perform beam management for the UE based at least in part on the UE pose information and/or the UE pose information and/or UE antenna orientation information. In some aspects, the updated beam or measurement configuration is associated with beam switching or antenna panel switching at the UE. The beam switching may be associated with switching a downlink or uplink transmission configuration indicator (TCI) state for the UE. In some aspects, the updated beam or measurement configuration is associated with a change in a number of beams to be measured by the UE in a downlink or an uplink. In some aspects, the updated beam or measurement configuration is associated with measurement signals transmitted by the network entity to the UE. The measurement signals may include a synchronization signal block (SSB), a channel state information reference signal (CSI-RS), a pathloss reference signal, or a sounding reference signal (SRS). In some aspects, the updated beam or measurement configuration is associated with a timing advance change from the network entity. In some aspects, the updated beam or measurement configuration is associated with a measurement configuration change or a measurement reporting change for the UE from the network entity. In some aspects, the updated beam or measurement configuration is associated with a beam or panel change for the UE at a rate that satisfies a threshold.

In some aspects, the network entity may determine the updated beam or measurement configuration based at least in part on a matching function between the UE antenna orientation information and downlink and uplink beams to be used for UE communications, UE measurement configurations, and a UE measurement reporting frequency. The downlink and uplink beams may correspond to one or more TCI states.

In some aspects, the UE may transmit signal or beam measurements to the network entity. The UE may transmit the signal or beam measurements with the UE antenna orientation information. The network entity may determine to update an existing beam or measurement configuration of the UE based at least in part on the signal or beam measurements.

As shown by reference number 308, the network entity may transmit the updated beam or measurement configuration to the UE. The UE may perform beam switching, perform antenna panel switching, measure a different set of beams, etc. based at least in part on the updated beam or measurement configuration.

As shown by reference number 310, the UE may receive from the server, via the network entity, XR data associated with a rendered scene based at least in part on the UE pose information and the updated beam or measurement configuration. In other words, the XR data associated with the rendered scene may be based at least in part on the UE pose information transmitted from the UE to the server via the network entity. Further, the updated beam or measurement configuration may enable the UE to receive the XR data in a downlink from the network entity, after the XR data is transmitted from the server to the network entity.

In some aspects, the network entity may transmit, to the UE, the updated beam or measurement configuration and the XR data in a single message. The UE may process the XR data and the updated beam or measurement configuration, and XR data that is subsequently received at the UE may be received based at least in part on the updated beam or measurement configuration.

In some aspects, the UE may transmit, to the network entity, a beam or measurement request based at least in part on the UE antenna orientation information. In other words, the UE may determine that beam management is to be performed at the UE based at least in part on the UE antenna orientation information. In some aspects, the UE may transmit the beam or management request and the UE antenna orientation information to the network entity in a single message. The network entity may determine the updated beam or management configuration for the UE based at least in part on the beam or measurement request received from the UE.

In some aspects, the beam or measurement request may be associated with beam switching or antenna panel switching. In some aspects, the beam or measurement request may be associated with the change in the number of beams to be measured by the UE in the downlink or the uplink. In some aspects, the beam or measurement request may be associated with measurement signals from the network entity (e.g., an SSB, a CSI-RS, a pathloss reference signal, or an SRS). In some aspects, the beam or measurement request may be associated with a timing advance change from the network entity. In some aspects, the beam or measurement request may be associated with a measurement configuration change or a measurement reporting change from the network entity. In some aspects, the beam or measurement request may be associated with a beam or panel change at a rate that satisfies a threshold. In some aspects, the beam or measurement request may be associated with a periodicity that is based at least in part on a rate of change of orientation indicated by the orientation information.

In some aspects, the network entity may receive the UE pose information from the UE. The network entity may transmit the UE pose information to the server. The server may determine that the UE pose information is applicable for beam management for the UE, and the server may transmit the UE pose information back to the network entity. The beam management for the UE may be associated with a measurement configuration update or a measurement reporting update for the UE. The network entity may determine the UE antenna orientation information based at least in part on the UE pose information. The network entity may determine the updated beam or management configuration for the UE based at least in part on the UE antenna orientation information.

In some aspects, the network entity may receive the UE pose information from the UE. The network entity may transmit the UE pose information to the server. The server may determine that the UE pose information is applicable for beam management for the UE. The server may determine the UE antenna orientation information based at least in part on the UE pose information. The server may transmit the UE antenna orientation information to the network entity. The network entity may determine the updated beam or management configuration for the UE based at least in part on the UE antenna orientation information.

As indicated above, FIG. 3 is provided as an example. Other examples may differ from what is described with regard to FIG. 3.

Figure 4:
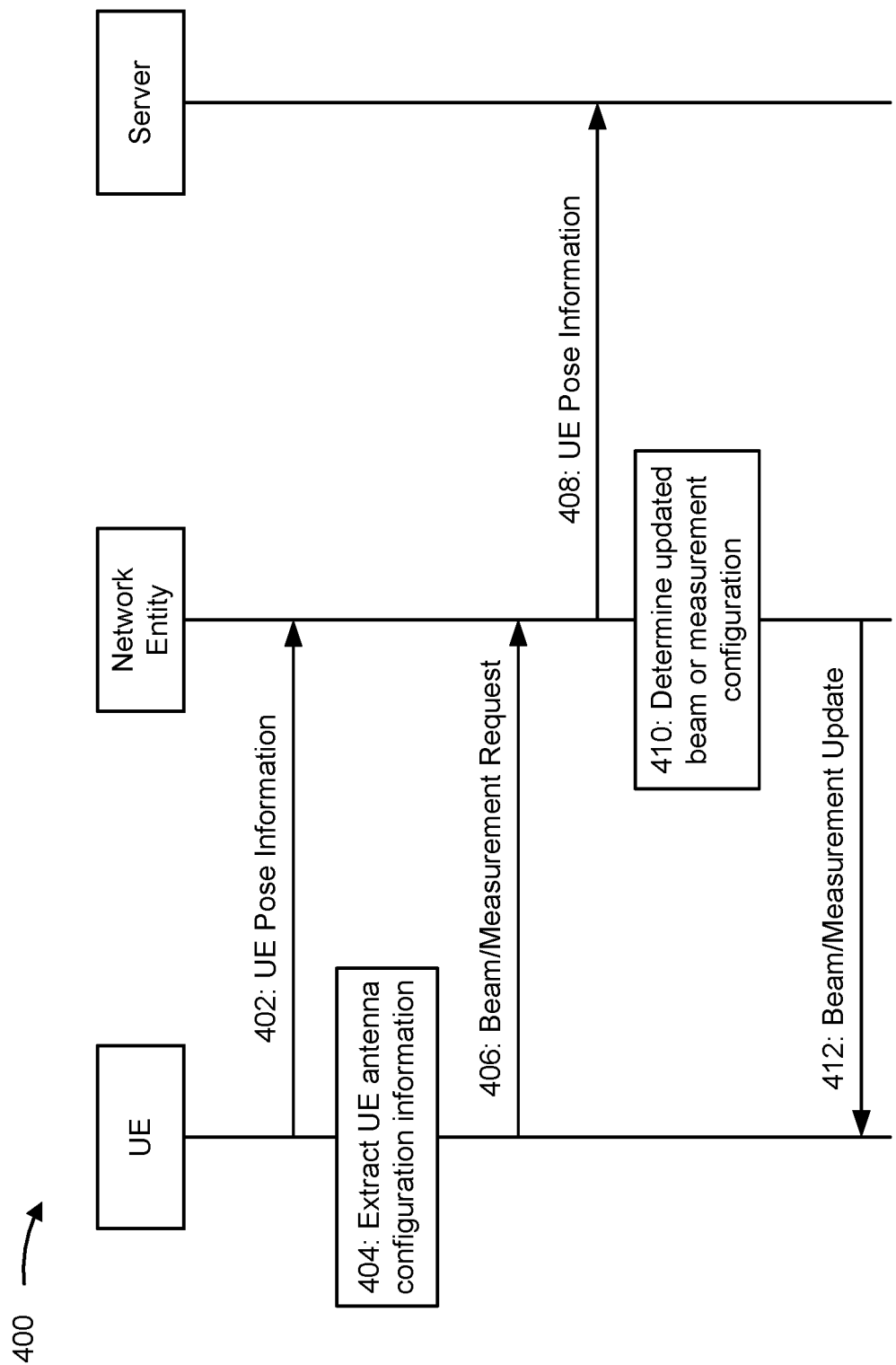

FIG. 4 is a diagram illustrating an example 400 associated with updating beam or measurement configurations using orientation information associated with UEs, in accordance with the present disclosure. As shown in FIG. 4, example 400 includes communication between a UE (e.g., UE 120), a network entity (e.g., base station 110), and a server. In some aspects, the UE, the network entity, and the server may be included in a wireless network such as wireless network 100.

As shown by reference number 402, the UE (e.g., an HMD) may transmit UE pose information to the network entity. The UE pose information may indicate information about a position of the UE. The UE pose information may be associated with an application that is executing on the UE. For example, the UE pose information may be used by the application to render a scene, or the UE pose information may be used by the server to generate a rendered scene for the UE. The UE pose information may be application-specific. In some cases, the UE pose information may indicate a head movement of a user associated with the UE or a head rotation of the user associated with the UE.

As shown by reference number 404, the UE may determine UE antenna orientation information based at least in part on the UE pose information or a viewpoint at the UE. The UE antenna orientation information may indicate an orientation of the UE, a rotation of the UE, and/or a position of the UE with respect to an antenna configuration of the UE. In another example, the UE antenna orientation information may indicate a rate of change in the orientation of the UE, a rate of change in the rotation of the UE, and/or a rate of change in the position of the UE with respect to an antenna configuration of the UE. The UE antenna orientation information may indicate the orientation, the rotation, and/or the position of the UE with respect to antennas included in the UE.

As shown by reference number 406, the UE may transmit a beam or measurement request to the network entity based at least in part on the UE antenna orientation information. In other words, the UE may determine, based at least in part on the UE antenna orientation information, that beam management is needed for the UE. In some aspects, the UE may request, from the network entity, beam change/switching (e.g., downlink or uplink TCI states) or antenna panel switching. The UE may request a change to a number of beams that the network entity configures the UE to measure on a downlink or an uplink. The UE may request measurement signals (e.g., SSB, CSI-RS, pathloss reference signal, or SRS) from the network entity. The UE may request timing advance changes from the network entity. In some aspects, when the UE antenna orientation information indicates a rate of change with respect to an UE antenna orientation of the UE, the UE may request a measurement configuration change or a measurement reporting change from the network entity, or the UE may request a beam or panel change/tracking at a certain rate from the network entity.

In some aspects, the UE may transmit the UE pose information and the beam or measurement request to the network entity in a single message.

As shown by reference number 408, the network entity may transmit the UE pose information to the server. The server may generate XR data associated with a rendered scene based at least in part on the UE pose information.

As shown by reference number 410, the network entity may determine an updated beam or measurement configuration for the UE based at least in part on the beam or measurement request.

As shown by reference number 412, the network entity may transmit the updated beam or measurement configuration to the UE based at least in part on the beam or measurement request. The UE may perform beam switching, perform antenna panel switching, measure a different set of beams, etc. based at least in part on the updated beam or measurement configuration.

In some aspects, the updated beam or measurement configuration may be associated with a periodicity that is based at least in part on a rate of orientation indicated by the UE antenna orientation information. For example, when a rate of orientation is relatively slow, the network entity may reduce a periodicity associated with measurements and measurement reporting. The measurements may include layer 1 (L1) measurements, such as beam measurements or RSRP measurements. The measurements may include layer 3 (L3) measurements, such as radio link monitoring (RLM) measurements or beam failure detection (BFD) measurements. As another example, when the rate of orientation is relatively fast, the network entity may increase the periodicity associated with measurements and measurement reporting.

As indicated above, FIG. 4 is provided as an example. Other examples may differ from what is described with regard to FIG. 4.

Figure 5:
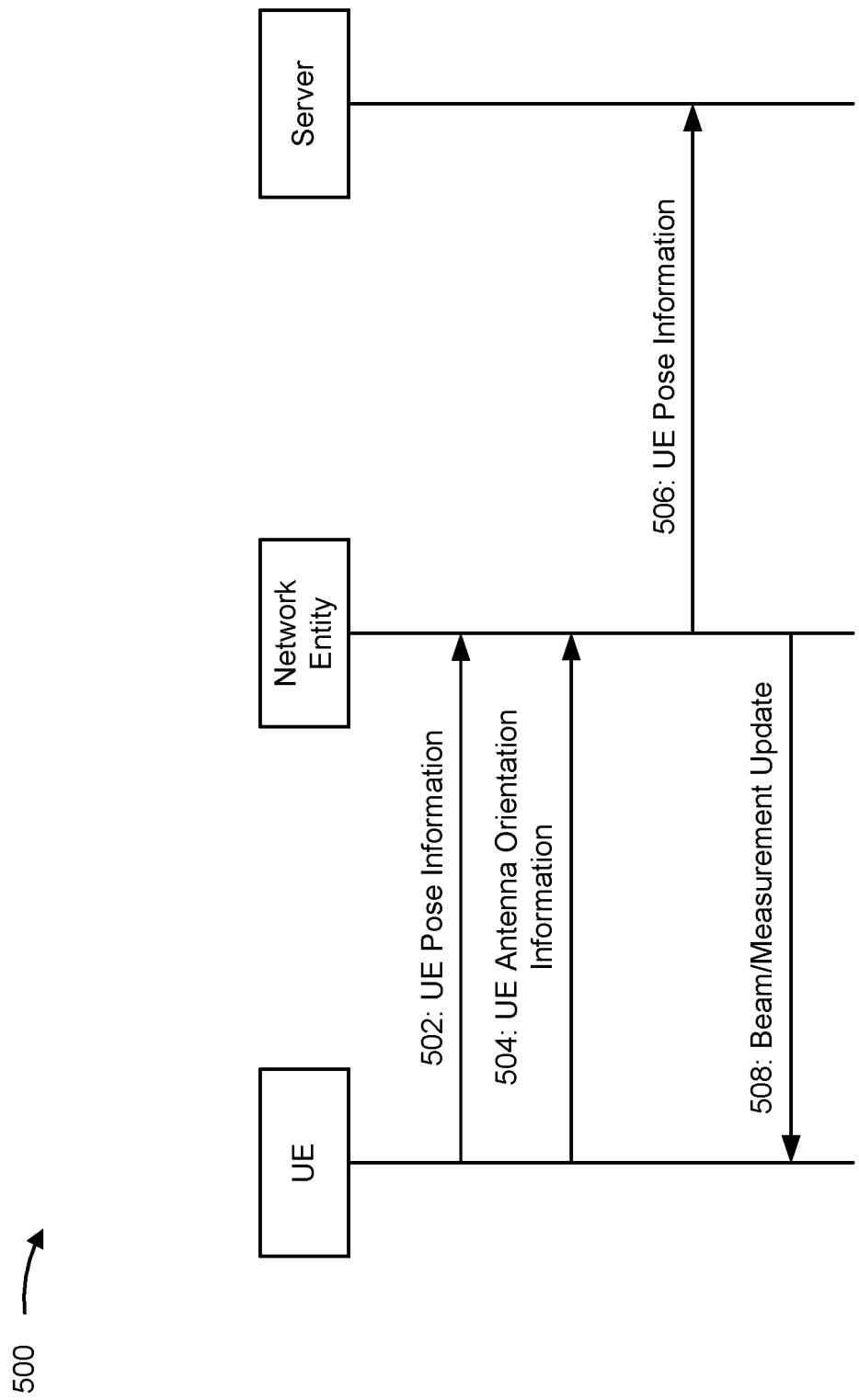

FIG. 5 is a diagram illustrating an example 500 associated with updating beam or measurement configurations using antenna orientation information associated with UEs, in accordance with the present disclosure. As shown in FIG. 5, example 500 includes communication between a UE (e.g., UE 120), a network entity (e.g., base station 110), and a server. In some aspects, the UE, the network entity, and the server may be included in a wireless network such as wireless network 100.

As shown by reference number 502, the UE may transmit UE pose information to the network entity, as shown by reference number 402.

As shown by reference number 504, the UE may transmit UE antenna orientation information to the network entity. The UE may determine the UE antenna orientation information based at least in part on the UE pose information. The UE antenna orientation information may indicate a rotation of the UE, a position of the UE, etc. with respect to an antenna configuration of the UE. In another example, the UE antenna orientation information may indicate a rate of change in the rotation of the UE, a rate of change in the position of the UE, etc. with respect to an antenna configuration of the UE.

As shown by reference number 506, the network entity may transmit the UE pose information to the server, as shown by reference number 406.

As shown by reference number 508, the network entity may transmit an updated beam or measurement configuration to the UE based at least in part on the UE antenna orientation information. In other words, the network entity may determine, based at least in part on the UE antenna orientation information, that beam management is needed for the UE.

In some aspects, the UE may not request beam/measurement/measurement reporting changes from the network entity. Rather, the UE may transmit the UE antenna orientation information to the network entity. The network entity may determine whether a beam/measurement/measurement reporting update is needed for the UE based at least in part on the UE antenna orientation information. The network entity may run a matching function between the UE antenna orientation information and downlink/uplink beams (e.g., TCI states) to be used for communication, measurement configuration, and/or a measurement reporting frequency. In other words, based at least in part on the matching function, the network entity may determine whether the beam/measurement/measurement reporting update is needed for the UE.

As indicated above, FIG. 5 is provided as an example. Other examples may differ from what is described with regard to FIG. 5.

Figure 6:
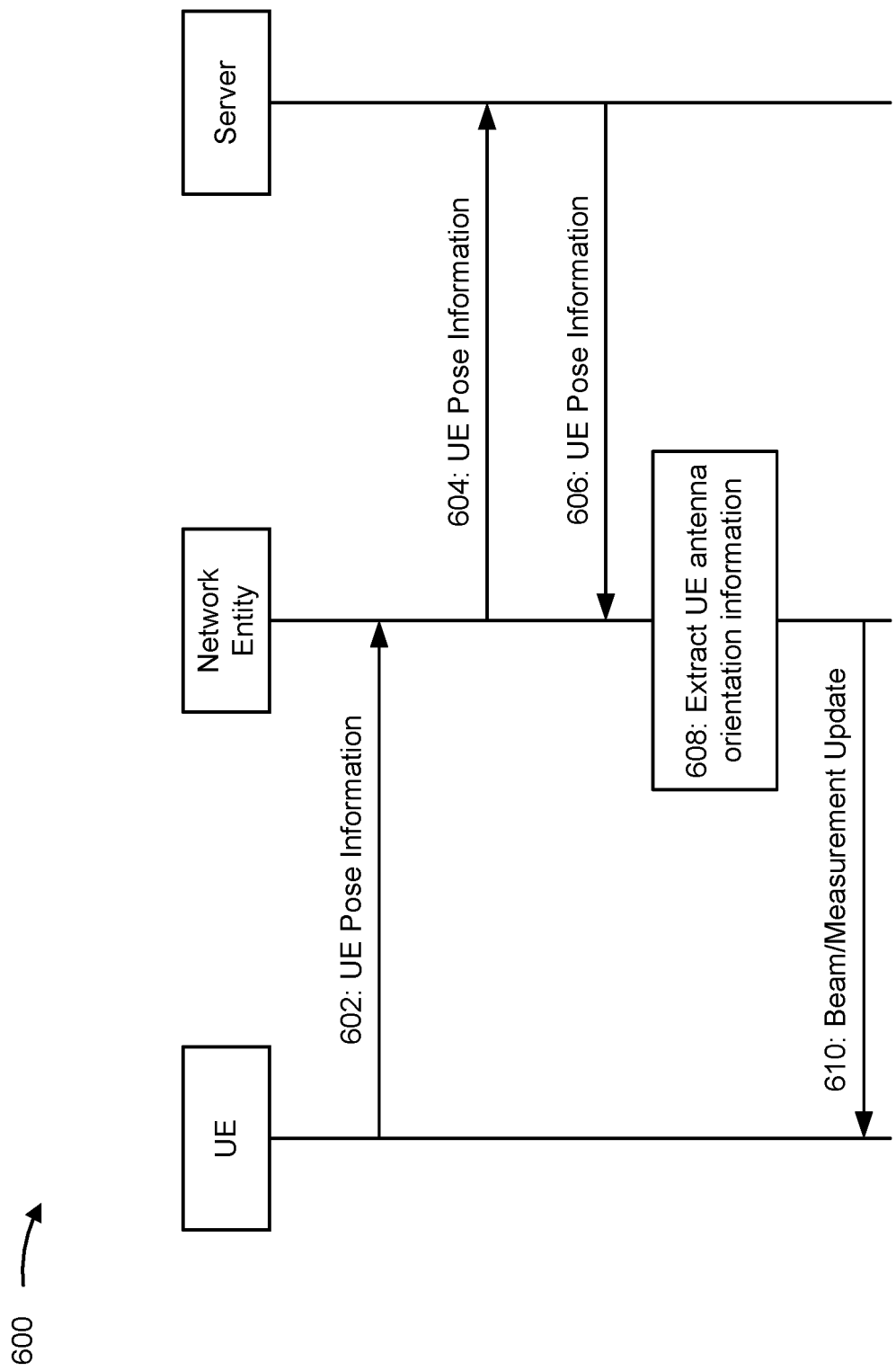

FIG. 6 is a diagram illustrating an example 600 associated with updating beam or measurement configurations using antenna orientation information associated with UEs, in accordance with the present disclosure. As shown in FIG. 6, example 600 includes communication between a UE (e.g., UE 120), a network entity (e.g., base station 110), and a server. In some aspects, the UE, the network entity, and the server may be included in a wireless network such as wireless network 100.

As shown by reference number 602, the UE may transmit UE pose information to the network entity, as shown by reference number 402.

As shown by reference number 604, the network entity may transmit the UE pose information to the server, as shown by reference number 406.

As shown by reference number 606, the server may transmit the UE pose information or a portion of the UE pose information back to the server. For example, the server may determine that the UE pose information may be useful or applicable to beam management for the UE, and the server may transmit that UE pose information back to the server. In this case, the network entity may have automatically forwarded the UE pose information received from the UE to the server, with limited processing of the UE pose information. Thus, the network entity may not initially determine whether the UE pose information received from the UE may be useful for beam management. Rather, a receipt of the UE pose information from the server may trigger the network entity to determine an updated beam or measurement configuration for the UE.

As shown by reference number 608, the network entity may determine UE antenna orientation information based at least in part on the UE pose information.

As shown by reference number 610, the network entity may transmit the updated beam or measurement configuration to the UE. The network entity may determine the updated beam or measurement configuration based at least in part on the UE antenna orientation information.

In some aspects, the UE may transmit the UE pose information to the network entity, and the network entity may transmit the UE pose information to the server. The server may determine that the UE pose information may be useful to the network entity for beam management of the UE, and the server may forward the UE pose information to the network entity. The network entity may perform beam management for the UE based at least in part on the UE antenna orientation information extracted from the UE pose information, which may involve a measurement configuration update or a measurement reporting update. In some cases, this approach to beam management may involve increased latency since the UE pose information may be transmitted to the server before being forwarded to the network entity.

As indicated above, FIG. 6 is provided as an example. Other examples may differ from what is described with regard to FIG. 6.

Figure 7:
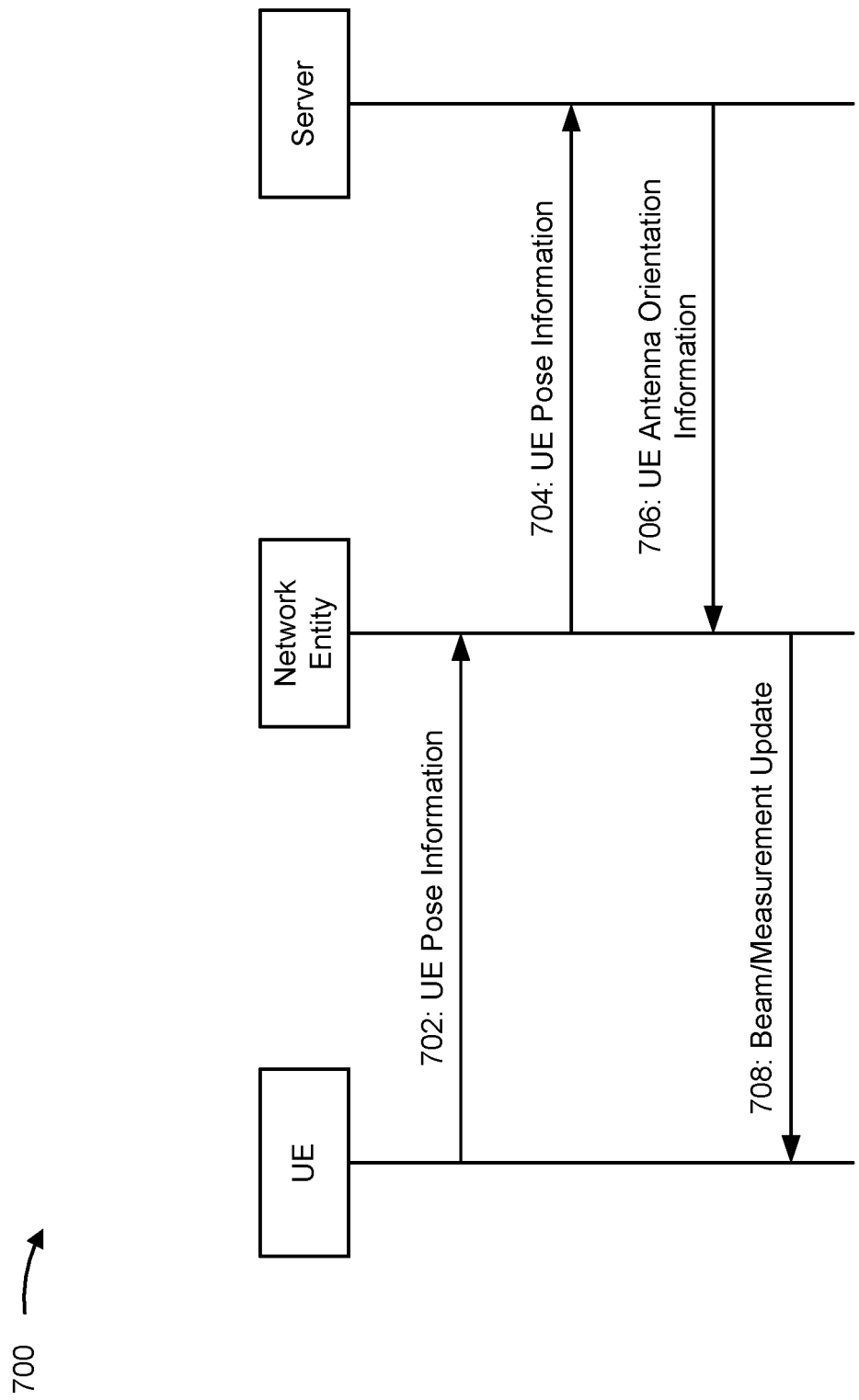

FIG. 7 is a diagram illustrating an example 700 associated with updating beam or measurement configurations using antenna orientation information associated with UEs, in accordance with the present disclosure. As shown in FIG. 7, example 700 includes communication between a UE (e.g., UE 120), a network entity (e.g., base station 110), and a server. In some aspects, the UE, the network entity, and the server may be included in a wireless network such as wireless network 100.

As shown by reference number 702, the UE may transmit UE pose information to the network entity, as shown by reference number 402.

As shown by reference number 704, the network entity may transmit the UE pose information to the server, as shown by reference number 406.

As shown by reference number 706, the server may transmit UE antenna orientation information to the network entity. The UE antenna orientation information may be based at least in part on the UE pose information and an antenna configuration of the UE.

As shown by reference number 708, the network entity may transmit an updated beam or measurement configuration to the UE. The network entity may determine the updated beam or measurement configuration based at least in part on the UE antenna orientation information received from the server.

In some aspects, the server may transmit the UE pose information to the network entity, and the network entity may determine whether to update an existing beam or measurement configuration of the UE based at least in part on the UE pose information. In some aspects, the server may extract the UE antenna orientation information from the UE pose information, and the server may transmit the UE antenna orientation information to the network entity. The network entity may determine whether to update the existing beam or measurement configuration of the UE based at least in part on the UE antenna orientation information.

As indicated above, FIG. 7 is provided as an example. Other examples may differ from what is described with regard to FIG. 7.

Figure 8:
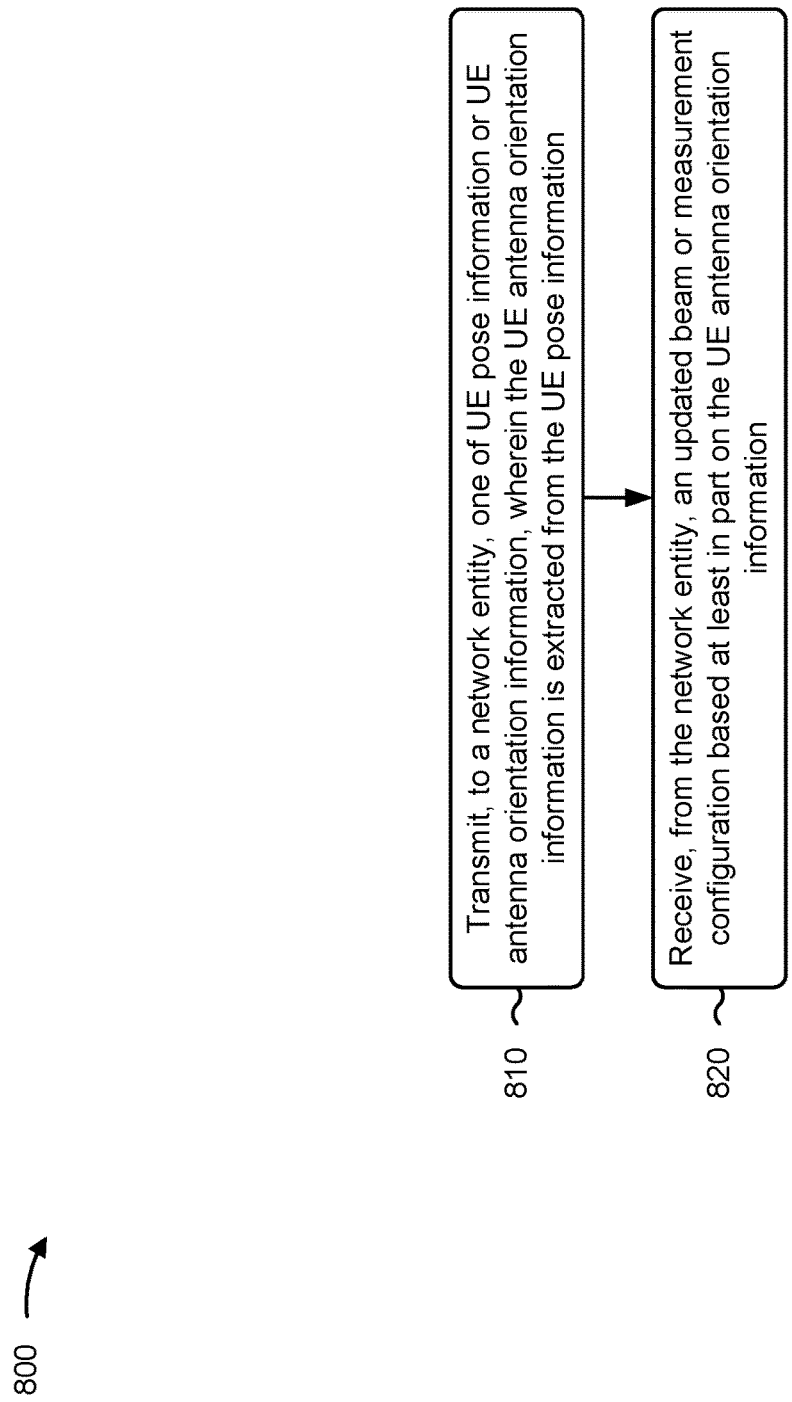
FIGS. 8-9 are diagrams illustrating example processes associated with updating beam or measurement configurations using antenna orientation information associated with UEs, in accordance with the present disclosure.

FIG. 8 is a diagram illustrating an example process 800 performed, for example, by a UE, in accordance with the present disclosure. Example process 800 is an example where the UE (e.g., UE 120) performs operations associated with updating beam or measurement configurations using antenna orientation information associated with UEs.

As shown in FIG. 8, in some aspects, process 800 may include transmitting, to a network entity, one of UE pose information or UE antenna orientation information, wherein the UE antenna orientation information is extracted from the UE pose information (block 810). For example, the UE (e.g., using transmission component 1004, depicted in FIG. 10) may transmit, to a network entity, one of UE pose information or UE antenna orientation information, wherein the UE antenna orientation information is extracted from the UE pose information, as described above, for example, with reference to FIGS. 3, 4, 5, 6, and/or 7.

As further shown in FIG. 8, in some aspects, process 800 may include receiving, from the network entity, an updated beam or measurement configuration based at least in part on the UE antenna orientation information (block 820). For example, the UE (e.g., using reception component 1002, depicted in FIG. 10) may receive, from the network entity, an updated beam or measurement configuration based at least in part on the UE antenna orientation information, as described above, for example, with reference to FIGS. 3, 4, 5, 6, and/or 7.

Process 800 may include additional aspects, such as any single aspect or any combination of aspects described below and/or in connection with one or more other processes described elsewhere herein.

In a first aspect, process 800 includes receiving, from a server via the network entity, extended reality data associated with a rendered scene based at least in part on the UE pose information and the updated beam or measurement configuration.

In a second aspect, alone or in combination with the first aspect, the process 800 further comprises extracting the UE antenna orientation information from the UE pose information based at least in part on a mapping between the UE pose information and the UE antenna orientation information.

In a third aspect, alone or in combination with one or more of the first and second aspects, transmitting one of UE pose information or UE antenna orientation information comprises transmitting the UE pose information to the network entity to enable the network entity to determine the updated beam or measurement configuration based at least in part on the UE antenna orientation information extracted from the UE pose information.

In a fourth aspect, alone or in combination with one or more of the first through third aspects, transmitting one of UE pose information or UE antenna orientation information comprises transmitting the UE antenna orientation information to the network entity to enable the network entity to determine the updated beam or measurement configuration based at least in part on the UE antenna orientation information.

In a fifth aspect, alone or in combination with one or more of the first through fourth aspects, transmitting one of UE pose information or UE antenna orientation information comprises transmitting the UE pose information to a server via the network entity to enable the network entity to determine the updated beam or measurement configuration based at least in part on the UE pose information received from the server.

In a sixth aspect, alone or in combination with one or more of the first through fifth aspects, transmitting one of UE pose information or UE antenna orientation information comprises transmitting the UE pose information to a server via the network entity to enable the network entity to determine the updated beam or measurement configuration based at least in part on the UE antenna orientation information received from the server.

In a seventh aspect, alone or in combination with one or more of the first through sixth aspects, process 800 includes transmitting, to the network entity, a signal or beam measurement, wherein the updated beam or measurement configuration is based at least in part on the signal or beam measurement.

In an eighth aspect, alone or in combination with one or more of the first through seventh aspects, the UE antenna orientation information indicates one or more of rotation information associated with the UE, and/or positioning information associated with the UE.

In a ninth aspect, alone or in combination with one or more of the first through eighth aspects, the UE antenna orientation information indicates one or more of a change in rotation associated with the UE, and/or a change in position associated with the UE.

In a tenth aspect, alone or in combination with one or more of the first through ninth aspects, process 800 includes transmitting, to the network entity, a beam or measurement request based at least in part on the UE antenna orientation information.

In an eleventh aspect, alone or in combination with one or more of the first through tenth aspects, the beam or measurement request is associated with a beam switching or an antenna panel switching, and wherein the beam switching is associated with switching a downlink or uplink transmission configuration indicator state.

In a twelfth aspect, alone or in combination with one or more of the first through eleventh aspects, the beam or measurement request is associated with a change in a number of beams to be measured by the UE in a downlink or an uplink.

In a thirteenth aspect, alone or in combination with one or more of the first through twelfth aspects, the beam or measurement request is associated with measurement signals from the network entity, wherein the measurement signals include one or more of a synchronization signal block, a channel state information reference signal, a pathloss reference signal, or a sounding reference signal.

In a fourteenth aspect, alone or in combination with one or more of the first through thirteenth aspects, the beam or measurement request is associated with a timing advance change from the network entity.

In a fifteenth aspect, alone or in combination with one or more of the first through fourteenth aspects, the beam or measurement request is associated with a measurement configuration change or a measurement reporting change from the network entity.

In a sixteenth aspect, alone or in combination with one or more of the first through fifteenth aspects, the beam or measurement request is associated with a beam or panel change at a rate that satisfies a threshold.

In a seventeenth aspect, alone or in combination with one or more of the first through sixteenth aspects, the beam or measurement request and the orientation information are associated with a single message.

In an eighteenth aspect, alone or in combination with one or more of the first through seventeenth aspects, the updated beam or measurement configuration is associated with a periodicity that is based at least in part on a rate of change in UE orientation indicated by the UE antenna orientation information.

In a nineteenth aspect, alone or in combination with one or more of the first through eighteenth aspects, the UE is a head-mounted display.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
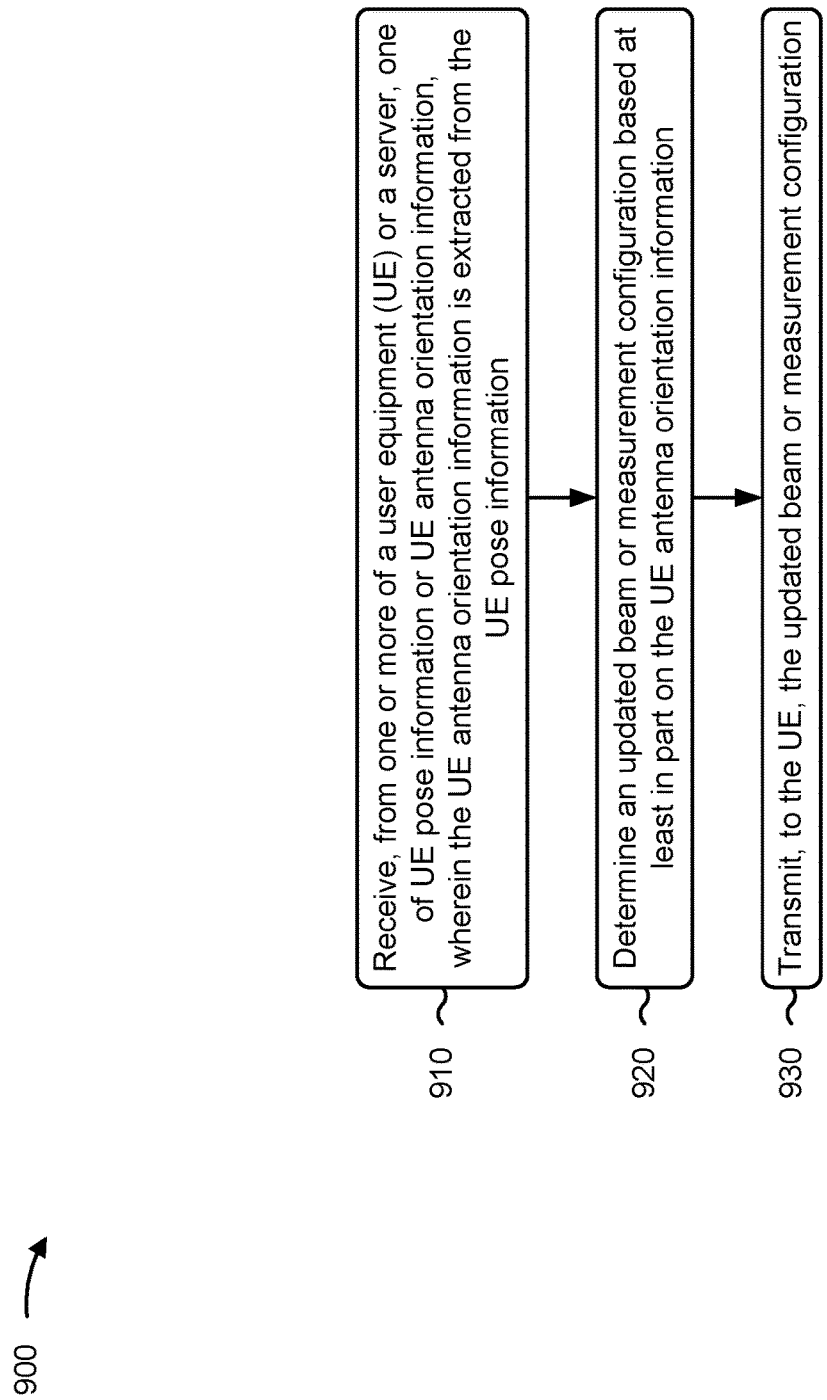

FIG. 9 is a diagram illustrating an example process 900 performed, for example, by a network entity, in accordance with the present disclosure. Example process 900 is an example where the network entity (e.g., base station 110) performs operations associated with updating beam or measurement configurations using antenna orientation information associated with UEs.

As shown in FIG. 9, in some aspects, process 900 may include receiving, from one or more of a UE or a server, one of UE pose information or UE antenna orientation information, wherein the UE antenna orientation information is extracted from the UE pose information (block 910). For example, the network entity (e.g., using reception component 1102, depicted in FIG. 11) may receive, from one or more of a UE or a server, one of UE pose information or UE antenna orientation information, wherein the UE antenna orientation information is extracted from the UE pose information, as described above, for example, with reference to FIGS. 3, 4, 5, 6, and/or 7.

As further shown in FIG. 9, in some aspects, process 900 may include determining an updated beam or measurement configuration based at least in part on the UE antenna orientation information (block 920). For example, the network entity (e.g., using determination component 1108, depicted in FIG. 11) may determine an updated beam or measurement configuration based at least in part on the UE antenna orientation information, as described above, for example, with reference to FIGS. 3, 4, 5, 6, and/or 7.

As further shown in FIG. 9, in some aspects, process 900 may include transmitting, to the UE, the updated beam or measurement configuration (block 930). For example, the network entity (e.g., using transmission component 1104, depicted in FIG. 11) may transmit, to the UE, the updated beam or measurement configuration, as described above, for example, with reference to FIGS. 3, 4, 5, 6, and/or 7.

Process 900 may include additional aspects, such as any single aspect or any combination of aspects described below and/or in connection with one or more other processes described elsewhere herein.

In a first aspect, process 900 includes transmitting, to the UE, extended reality data associated with a rendered scene based at least in part on the UE pose information and the updated beam or measurement configuration.

In a second aspect, alone or in combination with the first aspect, the updated beam or measurement configuration and the extended reality data are associated with a single message.

In a third aspect, alone or in combination with one or more of the first and second aspects, process 900 includes receiving, from the UE, a signal or beam measurement, wherein the updated beam or measurement configuration is based at least in part on the signal or beam measurement.

In a fourth aspect, alone or in combination with one or more of the first through third aspects, determining the updated beam or measurement configuration comprises determining the updated beam or measurement configuration based at least in part on a matching function between the UE antenna orientation information and downlink and uplink beams to be used for UE communications, UE measurement configurations, and a UE measurement reporting frequency, and wherein the downlink and uplink beams correspond to one or more transmission configuration indicator states.

In a fifth aspect, alone or in combination with one or more of the first through fourth aspects, the UE antenna orientation information indicates one or more of rotation information associated with the UE, and/or positioning information associated with the UE.

In a sixth aspect, alone or in combination with one or more of the first through fifth aspects, the orientation information indicates one or more of a change in rotation associated with the UE, and/or a change in position associated with the UE.

In a seventh aspect, alone or in combination with one or more of the first through sixth aspects, process 900 includes receiving, from the UE, a beam or measurement request, and wherein determining the updated beam or measurement configuration is based at least in part on the beam or measurement request.

In an eighth aspect, alone or in combination with one or more of the first through seventh aspects, the beam or measurement request is associated with a beam switching or an antenna panel switching, and wherein the beam switching is associated with switching a downlink or uplink transmission configuration indicator state.

In a ninth aspect, alone or in combination with one or more of the first through eighth aspects, the beam or measurement request is associated with a change in a number of beams to be measured by the UE in a downlink or an uplink.

In a tenth aspect, alone or in combination with one or more of the first through ninth aspects, the beam or measurement request is associated with measurement signals from the network entity, wherein the measurement signals include one or more of a synchronization signal block, a channel state information reference signal, a pathloss reference signal, or a sounding reference signal.

In an eleventh aspect, alone or in combination with one or more of the first through tenth aspects, the beam or measurement request is associated with a timing advance change from the network entity.

In a twelfth aspect, alone or in combination with one or more of the first through eleventh aspects, the beam or measurement request is associated with a measurement configuration change or a measurement reporting change from the network entity.

In a thirteenth aspect, alone or in combination with one or more of the first through twelfth aspects, the beam or measurement request is associated with a beam or panel change at a rate that satisfies a threshold.

In a fourteenth aspect, alone or in combination with one or more of the first through thirteenth aspects, the beam or measurement request and the orientation information are associated with a single message.

In a fifteenth aspect, alone or in combination with one or more of the first through fourteenth aspects, receiving one of UE pose information or UE antenna orientation information comprises receiving the UE pose information, and further comprising transmitting the UE pose information to the server, and receiving, from the server, the extended reality data associated with the rendered scene based at least in part on the UE pose information.

In a sixteenth aspect, alone or in combination with one or more of the first through fifteenth aspects, receiving one of UE pose information or UE antenna orientation information comprises receiving the UE pose information, and further comprising transmitting the UE pose information to the server, receiving, from the server, the UE pose information based at least in part on a determination that the UE pose information is applicable for beam management for the UE, wherein the beam management is associated with a measurement configuration update or a measurement reporting update, and determining the UE antenna orientation information based at least in part on the UE pose information, and wherein the updated beam or measurement configuration is based at least in part on the UE antenna orientation information.

In a seventeenth aspect, alone or in combination with one or more of the first through sixteenth aspects, receiving one of UE pose information or UE antenna orientation information comprises receiving the UE pose information, and further comprising: transmitting the UE pose information to the server to enable the server to extract the UE antenna orientation information from the UE pose information; and receiving, from the server, the UE antenna orientation information, wherein the beam management is associated with a measurement configuration update or a measurement reporting update, and wherein the updated beam or measurement configuration is based at least in part on the UE antenna orientation information.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
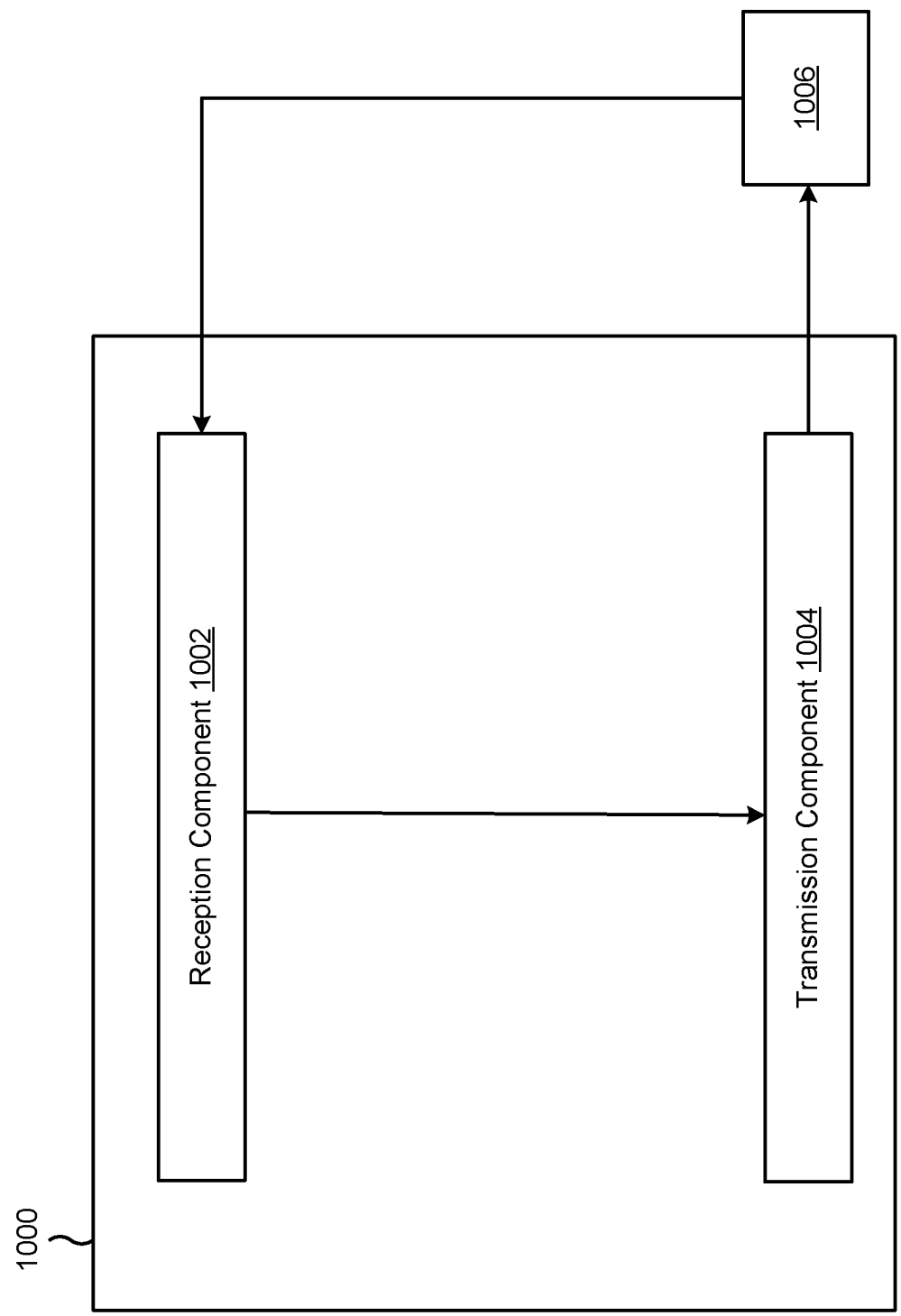
FIGS. 10-11 are block diagrams of example apparatuses for wireless communication, in accordance with the present disclosure.

FIG. 10 is a block diagram of an example apparatus 1000 for wireless communication. The apparatus 1000 may be a UE, or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004.

In some aspects, the apparatus 1000 may be configured to perform one or more operations described herein in connection with FIGS. 3-7. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the UE described above in connection with FIG. 2. Additionally, or alternatively, one or more components shown in FIG. 10 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a demodulator, a MIMO detector, a receive processor, a controller/processor, a memory, or a combination thereof, of the UE described above in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the UE described above in connection with FIG. 2. In some aspects, the transmission component 1004 may be co-located with the reception component 1002 in a transceiver.

The transmission component 1004 may transmit, to a network entity, one of UE pose information or UE antenna orientation information, wherein the UE antenna orientation information is extracted from the UE pose information. The reception component 1002 may receive, from the network entity, an updated beam or measurement configuration based at least in part on the UE antenna orientation information.

The reception component 1002 may receive, from a server via the network entity, extended reality data associated with a rendered scene based at least in part on the UE pose information and the updated beam or measurement configuration. The transmission component 1004 may transmit, to the network entity, a signal or beam measurement, wherein the updated beam or measurement configuration is based at least in part on the signal or beam measurement. The transmission component 1004 may transmit, to the network entity, a beam or measurement request based at least in part on the UE antenna orientation information.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
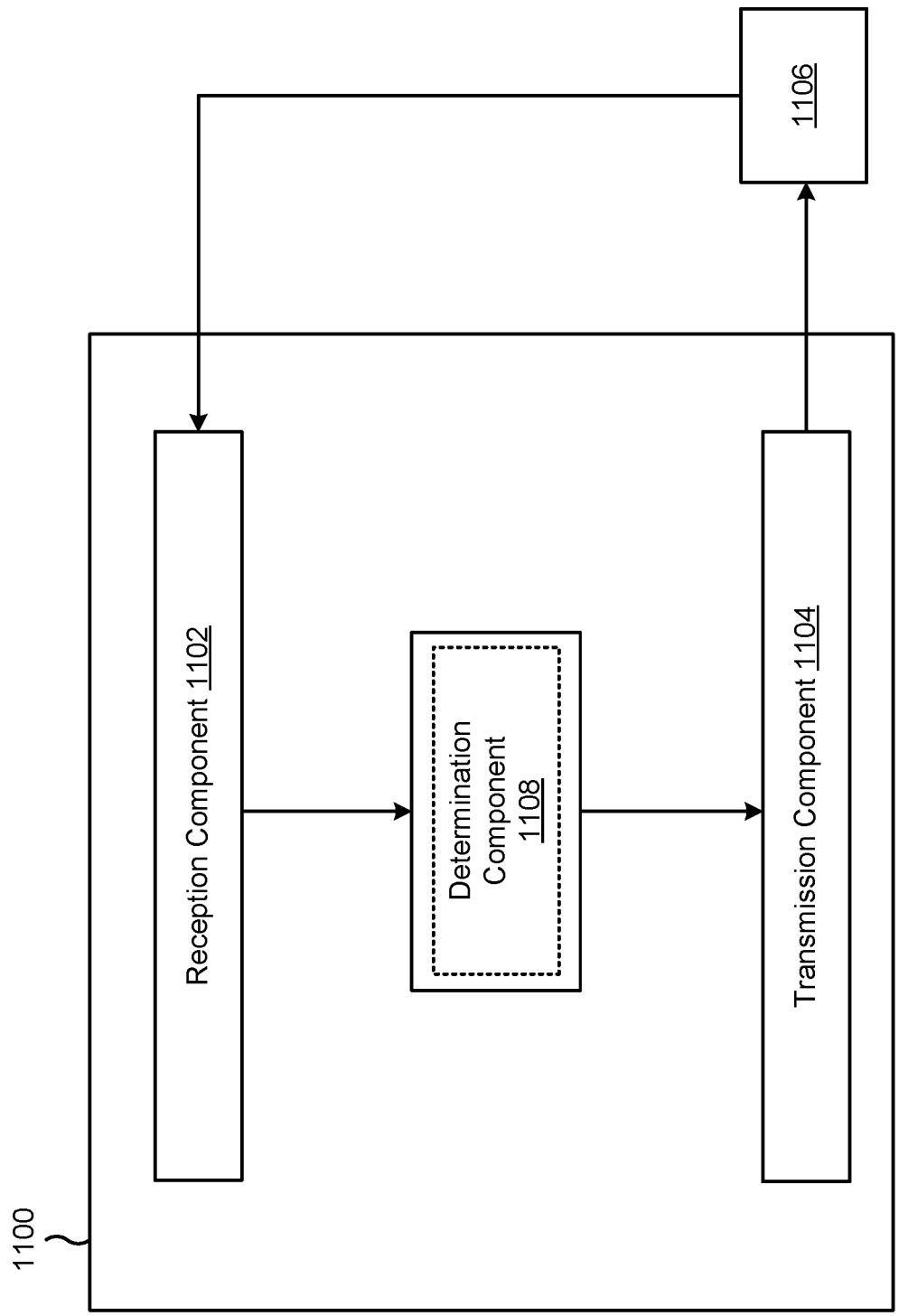

FIG. 11 is a block diagram of an example apparatus 1100 for wireless communication. The apparatus 1100 may be a network entity, or a network entity may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include a determination component 1108, among other examples.

In some aspects, the apparatus 1100 may be configured to perform one or more operations described herein in connection with FIGS. 3-7. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the base station described above in connection with FIG. 2. Additionally, or alternatively, one or more components shown in FIG. 11 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1106. In some aspects, the reception component 1102 may include one or more antennas, a demodulator, a MIMO detector, a receive processor, a controller/processor, a memory, or a combination thereof, of the base station described above in connection with FIG. 2.

The transmission component 1104 may transmit communications, such as reference signals, control information, data communications, or a combination thereof, to the apparatus 1106. In some aspects, one or more other components of the apparatus 1106 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modulator, a transmit MIMO processor, a transmit processor, a controller/processor, a memory, or a combination thereof, of the base station described above in connection with FIG. 2. In some aspects, the transmission component 1104 may be co-located with the reception component 1102 in a transceiver.

The reception component 1102 may receive, from one or more of a UE or a server, one of UE pose information or UE antenna orientation information, wherein the UE antenna orientation information is extracted from the UE pose information. The determination component 1108 may determine an updated beam or measurement configuration based at least in part on the UE antenna orientation information. The transmission component 1104 may transmit, to the UE, the updated beam or measurement configuration.

The transmission component 1104 may transmit, to the UE, extended reality data associated with a rendered scene based at least in part on the UE pose information and the updated beam or measurement configuration. The reception component 1102 may receive, from the UE, a signal or beam measurement, wherein the updated beam or measurement configuration is based at least in part on the signal or beam measurement. The reception component 1102 may receive, from the UE, a beam or measurement request.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
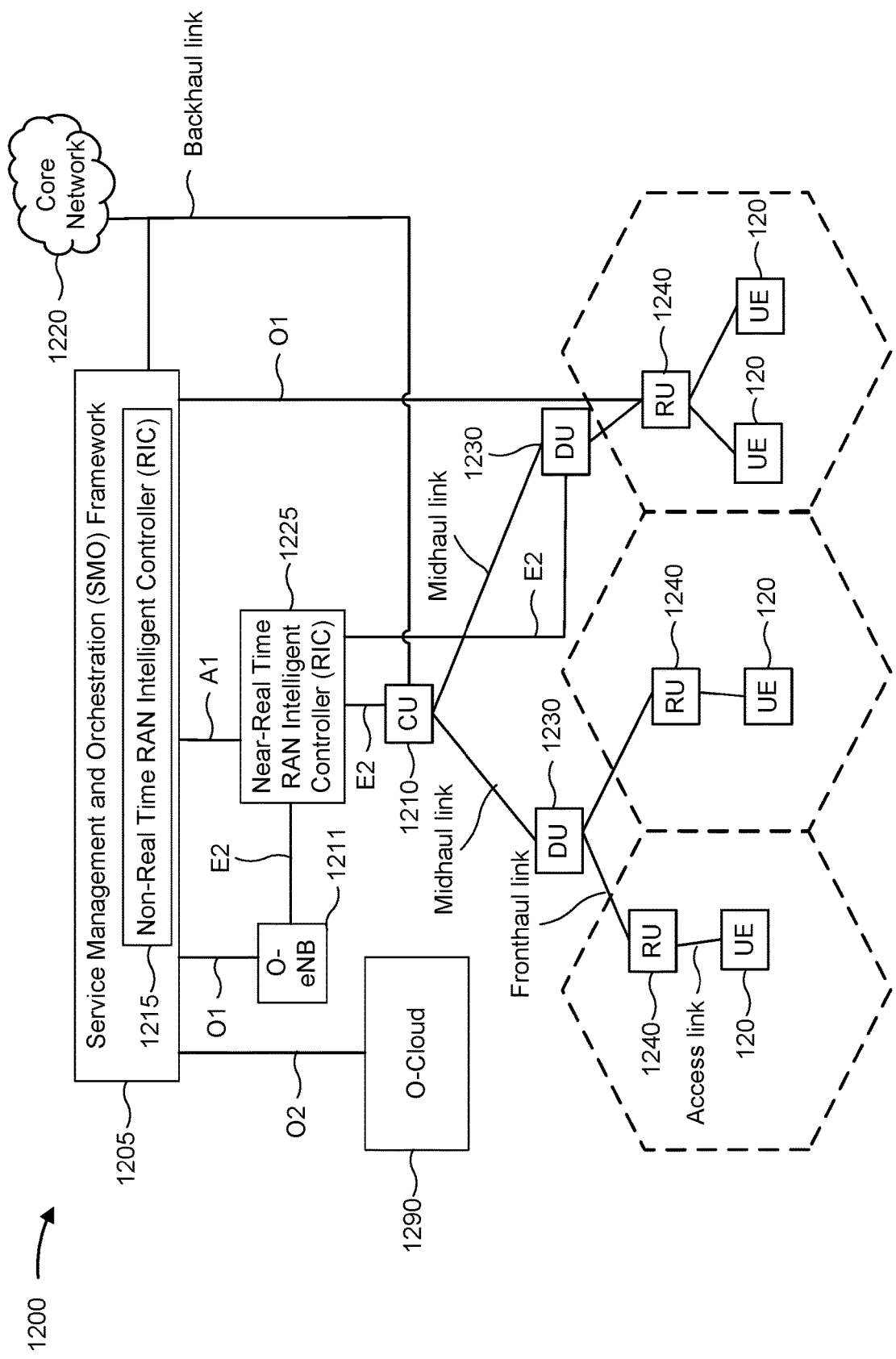
FIG. 12 is a diagram illustrating an example disaggregated base station architecture, in accordance with the present disclosure.

FIG. 12 is a diagram illustrating an example 1200 disaggregated base station architecture, in accordance with the present disclosure.

Deployment of communication systems, such as 5G NR systems, may be arranged in multiple manners with various components or constituent parts. In a 5G NR system, or network, a network node, a network entity, a mobility element of a network, a RAN node, a core network node, a network element, or a network equipment, such as a base station (BS, e.g., base station 110), or one or more units (or one or more components) performing base station functionality, may be implemented in an aggregated or disaggregated architecture. For example, a BS (such as a Node B (NB), eNB, NR BS, 5G NB, access point (AP), a TRP, a cell, or the like) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more CUs, one or more DUs, or one or more RUs. In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual centralized unit (VCU), a virtual distributed unit (VDU), or a virtual radio unit (VRU).

Base station-type operation or network design may consider aggregation characteristics of base station functionality. For example, disaggregated base stations may be utilized in an IAB network, an O-RAN (such as the network configuration sponsored by the O-RAN Alliance), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

The disaggregated base station architecture shown in FIG. 12 may include one or more CUs 1210 that can communicate directly with a core network 1220 via a backhaul link, or indirectly with the core network 1220 through one or more disaggregated base station units (such as a Near-Real Time (Near-RT) RAN Intelligent Controller (MC) 1225 via an E2 link, or a Non-Real Time (Non-RT) MC 1215 associated with a Service Management and Orchestration (SMO) Framework 1205, or both). A CU 1210 may communicate with one or more DUs 1230 via respective midhaul links, such as an F1 interface. The DUs 1230 may communicate with one or more RUs 1240 via respective fronthaul links. The RUs 1240 may communicate with respective UEs 120 via one or more radio frequency (RF) access links. In some implementations, the UE 120 may be simultaneously served by multiple RUs 1240.

Each of the units (e.g., the CUs 1210, the DUs 1230, the RUs 1240), as well as the Near-RT RICs 1225, the Non-RT RICs 1215, and the SMO Framework 1205, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 1210 may host one or more higher layer control functions. Such control functions can include RRC, packet data convergence protocol (PDCP), service data adaptation protocol (SDAP), or the like. Each control function can be implemented with an interface configured to communicate signals with other control functions hosted by the CU 1210. The CU 1210 may be configured to handle user plane functionality (e.g., Central Unit-User Plane (CU-UP)), control plane functionality (e.g., Central Unit-Control Plane (CU-CP)), or a combination thereof. In some implementations, the CU 1210 can be logically split into one or more CU-UP units and one or more CU-CP units. The CU-UP unit can communicate bidirectionally with the CU-CP unit via an interface, such as the E1 interface when implemented in an O-RAN configuration. The CU 1210 can be implemented to communicate with the DU 1230, as necessary, for network control and signaling.

The DU 1230 may correspond to a logical unit that includes one or more base station functions to control the operation of one or more RUs 1240. In some aspects, the DU 1230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3GPP. In some aspects, the DU 1230 may further host one or more low-PHY layers. Each layer (or module) can be implemented with an interface configured to communicate signals with other layers (and modules) hosted by the DU 1230, or with the control functions hosted by the CU 1210.

Lower-layer functionality can be implemented by one or more RUs 1240. In some deployments, an RU 1240, controlled by a DU 1230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 1240 can be implemented to handle over the air (OTA) communication with one or more UEs 120. In some implementations, real-time and non-real-time aspects of control and user plane communication with the RU(s) 1240 can be controlled by the corresponding DU 1230. In some scenarios, this configuration can enable the DU(s) 1230 and the CU 1210 to be implemented in a cloud-based RAN architecture, such as a vRAN architecture.

The SMO Framework 1205 may be configured to support RAN deployment and provisioning of non-virtualized and virtualized network elements. For non-virtualized network elements, the SMO Framework 1205 may be configured to support the deployment of dedicated physical resources for RAN coverage requirements which may be managed via an operations and maintenance interface (such as an O1 interface). For virtualized network elements, the SMO Framework 1205 may be configured to interact with a cloud computing platform (such as an open cloud (O-Cloud) 1290) to perform network element life cycle management (such as to instantiate virtualized network elements) via a cloud computing platform interface (such as an O2 interface). Such virtualized network elements can include, but are not limited to, CUs 1210, DUs 1230, RUs 1240 and Near-RT RICs 1225. In some implementations, the SMO Framework 1205 can communicate with a hardware aspect of a 4G RAN, such as an open eNB (O-eNB) 1111, via an O1 interface. Additionally, in some implementations, the SMO Framework 1205 can communicate directly with one or more RUs 1240 via an O1 interface. The SMO Framework 1205 also may include a Non-RT RIC 1215 configured to support functionality of the SMO Framework 1205.

The Non-RT RIC 1215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 1225. The Non-RT RIC 1215 may be coupled to or communicate with (such as via an A1 interface) the Near-RT RIC 1225. The Near-RT RIC 1225 may be configured to include a logical function that enables near-real-time control and optimization of RAN elements and resources via data collection and actions over an interface (such as via an E2 interface) connecting one or more CUs 1210, one or more DUs 1230, or both, as well as an O-eNB, with the Near-RT RIC 1225.

In some implementations, to generate AI/ML models to be deployed in the Near-RT RIC 1225, the Non-RT RIC 1215 may receive parameters or external enrichment information from external servers. Such information may be utilized by the Near-RT RIC 1225 and may be received at the SMO Framework 1205 or the Non-RT RIC 1215 from non-network data sources or from network functions. In some examples, the Non-RT RIC 1215 or the Near-RT RIC 1225 may be configured to tune RAN behavior or performance. For example, the Non-RT RIC 1215 may monitor long-term trends and patterns for performance and employ AI/ML models to perform corrective actions through the SMO Framework 1205 (such as reconfiguration via O1) or via creation of RAN management policies (such as A1 policies).

As indicated above, FIG. 12 is provided as an example. Other examples may differ from what is described with regard to FIG. 12.

The following provides an overview of some Aspects of the present disclosure:

Aspect 1: A method of wireless communication performed by a user equipment (UE), comprising: transmitting, to a network entity, one of UE pose information or UE antenna orientation information, wherein the UE antenna orientation information is extracted from the UE pose information; and receiving, from the network entity, an updated beam or measurement configuration based at least in part on the UE antenna orientation information.

Aspect 2: The method of Aspect 1, further comprising: receiving, from a server via the network entity, extended reality data associated with a rendered scene based at least in part on the UE pose information and the updated beam or measurement configuration.

Aspect 3: The method of any of Aspects 1 through 2, further comprising: extracting the UE antenna orientation information from the UE pose information based at least in part on a mapping between the UE pose information and the UE antenna orientation information.

Aspect 4: The method of any of Aspects 1 through 3, wherein transmitting one of UE pose information or UE antenna orientation information comprises transmitting the UE pose information to the network entity to enable the network entity to determine the updated beam or measurement configuration based at least in part on the UE antenna orientation information extracted from the UE pose information.

Aspect 5: The method of any of Aspects 1 through 4, wherein transmitting one of UE pose information or UE antenna orientation information comprises transmitting the UE antenna orientation information to the network entity to enable the network entity to determine the updated beam or measurement configuration based at least in part on the UE antenna orientation information.

Aspect 6: The method of any of Aspects 1 through 5, wherein transmitting one of UE pose information or UE antenna orientation information comprises transmitting the UE pose information to a server via the network entity to enable the network entity to determine the updated beam or measurement configuration based at least in part on the UE pose information received from the server.

Aspect 7: The method of any of Aspects 1 through 6, wherein transmitting one of UE pose information or UE antenna orientation information comprises transmitting the UE pose information to a server via the network entity to enable the network entity to determine the updated beam or measurement configuration based at least in part on the UE antenna orientation information received from the server.

Aspect 8: The method of any of Aspects 1 through 7, further comprising: transmitting, to the network entity, a signal or beam measurement, wherein the updated beam or measurement configuration is based at least in part on the signal or beam measurement.

Aspect 9: The method of any of Aspects 1 through 8, wherein the UE antenna orientation information indicates one or more of: rotation information associated with the UE, and/or positioning information associated with the UE.

Aspect 10: The method of any of Aspects 1 through 9, wherein the UE antenna orientation information indicates one or more of: a change in rotation associated with the UE, and/or a change in position associated with the UE.

Aspect 11: The method of any of Aspects 1 through 10, further comprising: transmitting, to the network entity, a beam or measurement request based at least in part on the UE antenna orientation information.

Aspect 12: The method of Aspect 11, wherein the beam or measurement request is associated with a beam switching or an antenna panel switching, and wherein the beam switching is associated with switching a downlink or uplink transmission configuration indicator state.

Aspect 13: The method of Aspect 11, wherein the beam or measurement request is associated with a change in a number of beams to be measured by the UE in a downlink or an uplink.

Aspect 14: The method of Aspect 11, wherein the beam or measurement request is associated with measurement signals from the network entity, wherein the measurement signals include one or more of a synchronization signal block, a channel state information reference signal, a path-loss reference signal, or a sounding reference signal.

Aspect 15: The method of Aspect 11, wherein the beam or measurement request is associated with a timing advance change from the network entity.

Aspect 16: The method of Aspect 11, wherein the beam or measurement request is associated with a measurement configuration change or a measurement reporting change from the network entity.

Aspect 17: The method of Aspect 11, wherein the beam or measurement request is associated with a beam or panel change at a rate that satisfies a threshold.

Aspect 18: The method of Aspect 11, wherein the beam or measurement request and the orientation information are associated with a single message.

Aspect 19: The method of any of Aspects 1 through 18, wherein the updated beam or measurement configuration is associated with a periodicity that is based at least in part on a rate of change in UE orientation indicated by the UE antenna orientation information.

Aspect 20: The method of any of Aspects 1 through 19, wherein the UE is a head-mounted display.

Aspect 21: A method of wireless communication performed by a network entity, comprising: receiving, from one or more of a user equipment (UE) or a server, one of UE pose information or UE antenna orientation information, wherein the UE antenna orientation information is extracted from the UE pose information; determining an updated beam or measurement configuration based at least in part on the UE antenna orientation information; and transmitting, to the UE, the updated beam or measurement configuration.

Aspect 22: The method of Aspect 21, further comprising: transmitting, to the UE, extended reality data associated with a rendered scene based at least in part on the UE pose information and the updated beam or measurement configuration.

Aspect 23: The method of any of Aspects 21 through 22, wherein the updated beam or measurement configuration and the extended reality data are associated with a single message.

Aspect 24: The method of any of Aspects 21 through 23, further comprising: receiving, from the UE, a signal or beam measurement, wherein the updated beam or measurement configuration is based at least in part on the signal or beam measurement.

Aspect 25: The method of any of Aspects 21 through 24, wherein determining the updated beam or measurement configuration comprises determining the updated beam or measurement configuration based at least in part on a matching function between the UE antenna orientation information and downlink and uplink beams to be used for UE communications, UE measurement configurations, and a UE measurement reporting frequency, and wherein the downlink and uplink beams correspond to one or more transmission configuration indicator states.

Aspect 26: The method of any of Aspects 21 through 25, wherein the UE antenna orientation information indicates one or more of: rotation information associated with the UE, and/or positioning information associated with the UE.

Aspect 27: The method of any of Aspects 21 through 26, wherein the orientation information indicates one or more of: a change in rotation associated with the UE, and/or a change in position associated with the UE.

Aspect 28: The method of any of Aspects 21 through 27, further comprising: receiving, from the UE, a beam or measurement request; and wherein determining the updated beam or measurement configuration is based at least in part on the beam or measurement request. wherein determining the updated beam or measurement configuration is based at least in part on the beam or measurement request.

Aspect 29: The method of Aspect 28, wherein the beam or measurement request is associated with a beam switching or an antenna panel switching, and wherein the beam switching is associated with switching a downlink or uplink transmission configuration indicator state.

Aspect 30: The method of Aspect 28, wherein the beam or measurement request is associated with a change in a number of beams to be measured by the UE in a downlink or an uplink.

Aspect 31: The method of Aspect 28, wherein the beam or measurement request is associated with measurement signals from the network entity, wherein the measurement signals include one or more of a synchronization signal block, a channel state information reference signal, a pathloss reference signal, or a sounding reference signal.

Aspect 32: The method of Aspect 28, wherein the beam or measurement request is associated with a timing advance change from the network entity.

Aspect 33: The method of Aspect 28, wherein the beam or measurement request is associated with a measurement configuration change or a measurement reporting change from the network entity.

Aspect 34: The method of Aspect 28, wherein the beam or measurement request is associated with a beam or panel change at a rate that satisfies a threshold.

Aspect 35: The method of Aspect 28, wherein the beam or measurement request and the orientation information are associated with a single message.

Aspect 36: The method of any of Aspects 21 through 35, wherein receiving one of UE pose information or UE antenna orientation information comprises receiving the UE pose information, and further comprising: transmitting the UE pose information to the server; and receiving, from the server, the extended reality data associated with the rendered scene based at least in part on the UE pose information.

Aspect 37: The method of any of Aspects 21 through 36, wherein receiving one of UE pose information or UE antenna orientation information comprises receiving the UE pose information, and further comprising: transmitting the UE pose information to the server; receiving, from the server, the UE pose information based at least in part on a determination that the UE pose information is applicable for beam management for the UE, wherein the beam management is associated with a measurement configuration update or a measurement reporting update; and determining the UE antenna orientation information based at least in part on the UE pose information, and wherein the updated beam or measurement configuration is based at least in part on the UE antenna orientation information.

Aspect 38: The method of any of Aspects 21 through 37, wherein receiving one of UE pose information or UE antenna orientation information comprises receiving the UE pose information, and further comprising: transmitting the UE pose information to the server to enable the server to extract the UE antenna orientation information from the UE pose information; and receiving, from the server, the UE antenna orientation information, wherein the beam management is associated with a measurement configuration update or a measurement reporting update, and wherein the updated beam or measurement configuration is based at least in part on the UE antenna orientation information.

Aspect 39: An apparatus for wireless communication at a device, comprising a processor; memory coupled with the processor; and instructions stored in the memory and executable by the processor to cause the apparatus to perform the method of one or more Aspects of Aspects 1-20.

Aspect 40: A device for wireless communication, comprising a memory and one or more processors coupled to the memory, the memory and the one or more processors configured to perform the method of one or more Aspects of Aspects 1-20.

Aspect 41: An apparatus for wireless communication, comprising at least one means for performing the method of one or more Aspects of Aspects 1-20.

Aspect 42: A non-transitory computer-readable medium storing code for wireless communication, the code comprising instructions executable by a processor to perform the method of one or more Aspects of Aspects 1-20.

Aspect 43: A non-transitory computer-readable medium storing a set of instructions for wireless communication, the set of instructions comprising one or more instructions that, when executed by one or more processors of a device, cause the device to perform the method of one or more Aspects of Aspects 1-20.

Aspect 44: An apparatus for wireless communication at a device, comprising a processor; memory coupled with the processor; and instructions stored in the memory and executable by the processor to cause the apparatus to perform the method of one or more Aspects of Aspects 21-38.

Aspect 45: A device for wireless communication, comprising a memory and one or more processors coupled to the memory, the memory and the one or more processors configured to perform the method of one or more Aspects of Aspects 21-38.

Aspect 46: An apparatus for wireless communication, comprising at least one means for performing the method of one or more Aspects of Aspects 21-38.

Aspect 47: A non-transitory computer-readable medium storing code for wireless communication, the code comprising instructions executable by a processor to perform the method of one or more Aspects of Aspects 21-38.

Aspect 48: A non-transitory computer-readable medium storing a set of instructions for wireless communication, the set of instructions comprising one or more instructions that, when executed by one or more processors of a device, cause the device to perform the method of one or more Aspects of Aspects 21-38.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   transmitting, to a server and via a network entity, UE pose information to enable the server to render an extended reality scene for the UE; and
   receiving, from the network entity, an updated beam or measurement configuration, wherein the updated beam or measurement configuration is based at least in part on UE antenna orientation information,
   wherein the updated beam or measurement configuration is based at least in part on the server transmitting the UE pose information to the network entity using a determination that the UE pose information is applicable for beam management for the UE, and
   wherein receipt of the UE pose information from the server triggers the network entity to determine the updated beam or measurement configuration.

2. The method of claim 1, further comprising:
   receiving, from the server via the network entity, extended reality data associated with the extended reality scene based at least in part on the UE pose information and the updated beam or measurement configuration.

3. The method of claim 1, further comprising:
   extracting the UE antenna orientation information from the UE pose information based at least in part on a correlation between the UE pose information and the antenna configuration; and
   transmitting the extracted UE antenna orientation information to the network entity.

4. The method of claim 1, wherein transmitting the UE pose information enables the network entity to determine the updated beam or measurement configuration based at least in part on the UE pose information.

5. The method of claim 1, wherein transmitting the UE pose information enables the network entity to determine the updated beam or measurement configuration based at least in part on the UE pose information received from the server.

6. The method of claim 1, further comprising:
   transmitting, to the network entity, a signal or beam measurement, wherein the updated beam or measurement configuration is based at least in part on the signal or beam measurement.

7. The method of claim 1, further comprising:
   transmitting, to the network entity, a beam or measurement request based at least in part on the UE antenna orientation information.

8. The method of claim 7, wherein the beam or measurement request is associated with a beam switching or an antenna panel switching, and wherein the beam switching is associated with switching a downlink or uplink transmission configuration indicator state.

9. The method of claim 7, wherein the beam or measurement request is associated with a change in a number of beams to be measured by the UE in a downlink or an uplink.

10. The method of claim 7, wherein the beam or measurement request is associated with measurement signals from the network entity, wherein the measurement signals include one or more of a synchronization signal block, a channel state information reference signal, a pathloss reference signal, or a sounding reference signal.

11. The method of claim 7, wherein the beam or measurement request is associated with a timing advance change from the network entity.

12. The method of claim 7, wherein the beam or measurement request is associated with a measurement configuration change or a measurement reporting change from the network entity.

13. The method of claim 7, wherein the beam or measurement request is associated with a beam or panel change at a rate that satisfies a threshold.

14. The method of claim 7, wherein the beam or measurement request and the UE antenna orientation information are associated with a single message.

15. The method of claim 1, wherein the updated beam or measurement configuration is associated with a periodicity that is based at least in part on a rate of change in UE orientation indicated by the UE antenna orientation information.

16. The method of claim 1, wherein the updated beam or measurement configuration is based at least in part on the server transmitting the UE antenna orientation information, extracted from the UE pose information, to the network entity.

17. A method of wireless communication performed by a network entity, comprising:
- receiving, from a user equipment (UE), UE pose information, indicating a head movement or a head rotation of a user associated with the UE, for forwarding to a server to render an extended reality scene for the UE;
- transmitting the UE pose information to the server;
- receiving, from the server, the UE pose information based at least in part on a determination that the UE pose information is applicable for beam management for the UE;
- determining an updated beam or measurement configuration,
  - wherein receipt of the UE pose information from the server triggers the network entity to determine the updated beam or measurement configuration, and
  - wherein the updated beam or measurement configuration is based at least in part on UE antenna orientation information; and
- transmitting, to the UE, the updated beam or measurement configuration.

18. The method of claim 17, further comprising:
- transmitting, to the UE, extended reality data associated with the extended reality scene based at least in part on the UE pose information and the updated beam or measurement configuration.

19. The method of claim 17, further comprising:
- receiving, from the UE, a signal or beam measurement, wherein the updated beam or measurement configuration is based at least in part on the signal or beam measurement.

20. The method of claim 17, wherein determining the updated beam or measurement configuration comprises determining the updated beam or measurement configuration based at least in part on a matching function between the UE antenna orientation information and downlink and uplink beams to be used for UE communications, UE measurement configurations, and a UE measurement reporting frequency, and wherein the downlink and uplink beams correspond to one or more transmission configuration indicator states.

21. The method of claim 17, further comprising:
- receiving, from the UE, a beam or measurement request; and
- wherein determining the updated beam or measurement configuration is based at least in part on the beam or measurement request.

22. The method of claim 17, further comprising:
- receiving, from the server, extended reality data associated with the extended reality scene based at least in part on the UE pose information.

23. The method of claim 17, further comprising:
- receiving, from the server, the UE antenna orientation information, wherein beam management is associated with a measurement configuration update or a measurement reporting update, and wherein the updated beam or measurement configuration is based at least in part on the UE antenna orientation information.

24. A user equipment (UE) for wireless communication, comprising:
- a memory; and
- one or more processors, coupled to the memory, configured to:
  - transmit, to a server and via a network entity, UE pose information, to enable the server to render an extended reality scene for the UE; and
  - receive, from the network entity, an updated beam or measurement configuration,
  - wherein the updated beam or measurement configuration is based at least in part on UE antenna orientation information,
  - wherein the updated beam or measurement configuration is based at least in part on the server transmitting the UE pose information to the network entity using a determination that the UE pose information is applicable for beam management for the UE, and
  - wherein receipt of the UE pose information from the server triggers the network entity to determine the updated beam or measurement configuration.

25. The UE of claim 24, wherein the one or more processors are further configured to:
- receive, from the server via the network entity, extended reality data associated with the extended reality scene based at least in part on the UE pose information and the updated beam or measurement configuration.

26. The UE of claim 24, wherein the one or more processors are further configured to:
- transmit, to the network entity, a signal or beam measurement, wherein the updated beam or measurement configuration is based at least in part on the signal or beam measurement.

27. The UE of claim 24, wherein the one or more processors are further configured to:
- transmit, to the network entity, a beam or measurement request based at least in part on the UE antenna orientation information, wherein the beam or measurement request is associated with a beam or panel change at a rate that satisfies a threshold, and wherein the beam or measurement request and the UE antenna orientation information are associated with a single message.

28. The UE of claim 24, wherein the one or more processors are further configured to:
- transmit, to the network entity, a beam or measurement request based at least in part on the UE antenna orientation information.

29. The UE of claim 28, wherein the beam or measurement request is associated with a beam switching or an antenna panel switching, and wherein the beam switching is associated with switching a downlink or uplink transmission configuration indicator state.

30. A network entity for wireless communication, comprising:
- a memory; and
- one or more processors, coupled to the memory, configured to:
  - receive, from a user equipment (UE), UE pose information, indicating a head movement or a head rotation of a user associated with the UE, for forwarding to a server to render an extended reality scene for the UE;
  - transmit the UE pose information to the server;
  - receive, from the server, the UE pose information based at least in part on a determination that the UE pose information is applicable for beam management for the UE;
  - determine an updated beam or measurement configuration,
  - wherein receipt of the UE pose information from the server triggers the network entity to determine the updated beam or measurement configuration, and
  - wherein the updated beam or measurement configuration is based at least in part on UE antenna orientation information; and transmit, to the UE, the updated beam or measurement configuration.

\* \* \* \* \*